(12) United States Patent
George

(10) Patent No.: US 8,626,602 B2
(45) Date of Patent: Jan. 7, 2014

(54) CONSUMER SHOPPING AND PURCHASE SUPPORT SYSTEM AND MARKETPLACE

(76) Inventor: Marc George, Pasadena, MD (US)

( * ) Notice: Subject to any disclaimer, the term of this patent is extended or adjusted under 35 U.S.C. 154(b) by 23 days.

(21) Appl. No.: 13/295,587

(22) Filed: Nov. 14, 2011

(65) Prior Publication Data

US 2012/0123910 A1    May 17, 2012

Related U.S. Application Data

(60) Provisional application No. 61/413,064, filed on Nov. 12, 2010, provisional application No. 61/422,819, filed on Dec. 14, 2010, provisional application No. 61/425,483, filed on Dec. 21, 2010.

(51) Int. Cl.
*G06Q 30/00* (2012.01)
(52) U.S. Cl.
USPC .......................................................... 705/26.1
(58) Field of Classification Search
USPC .......................................................... 705/26.1
See application file for complete search history.

(56) References Cited

U.S. PATENT DOCUMENTS

| | | |
|---|---|---|
| 7,130,815 B1 | 10/2006 | Gupta |
| 2004/0103040 A1 | 5/2004 | Ronaghi |
| 2006/0080207 A1 | 4/2006 | Girija |
| 2006/0085318 A1 | 4/2006 | Cohoon |
| 2006/0253366 A1 | 11/2006 | Rebibo |
| 2007/0033133 A1 | 2/2007 | Pishevar |
| 2007/0073607 A1 | 3/2007 | Eydelman |
| 2011/0307345 A1* | 12/2011 | Kemper et al. ............... 705/26.3 |
| 2012/0158961 A1* | 6/2012 | Cragun et al. ................. 709/224 |

* cited by examiner

*Primary Examiner* — Mila Airapetian
(74) *Attorney, Agent, or Firm* — Ober, Kaler, Grimes & Shriver; Royal W. Craig

(57) ABSTRACT

A system including an Internet based server running a central data repository database, and deploying spiders to scour the Internet analyzing the millions of product-oriented web pages and newsgroup postings, plus a server application for classifying and indexing all of the information derived from the spiders. The web server pushes downloadable—"Rich Internet Application" (RIA) client application to subscribers running client devices. The RIA client application is accessible directly from any other enabled native application to draw information from the central data repository. The RIA client application presents a navigational user-interface on the client device that presents an array of robust information tools necessary for consumers to obtain a comprehensive shopping and purchase support and participate in alternative marketplaces without leaving the other native application pages they are viewing.

15 Claims, 28 Drawing Sheets

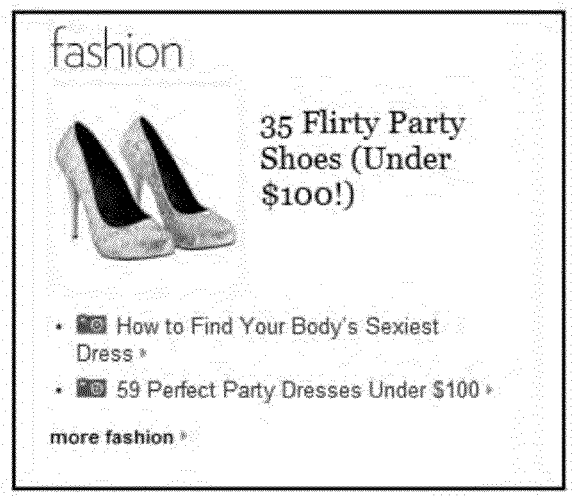

FIG. 27

```
<?xml version="1.0" encoding="utf-8"?>
<div id="ps4_fs3" class="features set1">
  <div class="feature manual first">
    <h3 class="header">
      <a href="/fashion" title="">
        <img src="/images/hdr-fashion.gif" alt="" class="featurehed" />
      </a>
    </h3>
    <div class="w">
      <a href="/fashion/2010/11/35-flirty-party-shoes-under-100" title="party shoes sparkles gold pump michale antonio">
        <img src="/images/fashion/2010/11/1119-06-party-shoes-sparkles-gold-pump-michael-antonio_tl.jpg"
          alt="party shoes sparkles gold pump michale antonio" class="soloImg"  />
      </a>
    </div>
    <div class="blurb">
      <div class="sub-header">
        <a href="/fashion/2010/11/35-flirty-party-shoes-under-100">35 Flirty Party Shoes (Under $100!)</a>
      </div>
      <ul class="links">
        <li class='first'>
          <img src="/images/icons/slideshow.gif" alt="slideshow" class="type slideshow" />
          <a href="/fashion/2010/11/how-to-find-your-bodys-sexiest-dress" >How to Find Your Body’s Sexiest Dress</a>
        </li>
        <li class='blurb-links-even last'>
          <img src="/images/icons/slideshow.gif" alt="slideshow" class="type slideshow" />
          <a href="/fashion/2010/11/59-perfect-party-dresses-under-100" >59 Perfect Party Dresses Under $100</a>
        </li>
      </ul>
    </div>
    <div class="footer">
      <a href="/fashion">more fashion</a>
    </div>
  </div>
</div>
```

FIG. 28

```xml
<?xml version="1.0" encoding="utf-8"?>
<div id="ps4_fs3" class="features set1">
<div class="feature manual first">
    <h3 class="header">
        <a href="/fashion" title="">
            <img src="/images/hdr-fashion.gif" alt="" class="featurehed" />
        </a>
    </h3>
    <div class="w">
        <a href="/fashion/2010/11/35-flirty-party-shoes-under-100" title="party shoes sparkles gold pump michale antonio">
            <img src="/images/fashion/2010/11/1119-06-party-shoes-sparkles-gold-pump-michael-antonio_t1.jpg" alt="party shoes sparkles gold pump michale antonio" class="soloimg">
            <product>
                <spatiallocation>5,20,5,25</spatiallocation>
                <productID>
                    <upc>123456 123456</upc>
                </productID>
                <caption>Michael Antonio Glitter Pump</caption>
                <srp>$35.00</srp>
                <title>www.ardenb.com</title>
                <link>http:///www.ardenb.com//catalog//product.jsp?categoryId=140&subCategoryId=25&productid=40205&source=pf&ref=b_aff_k10B2B3</link>
            </product>
        </a>
    </div>
    <div class="blurb">
        <div class="sub-header">
            <a href="/fashion/2010/11/35-flirty-party-shoes-under-100">35 Flirty Party Shoes (Under $100!)</a>
        </div>
        <ul class="links">
            <li class="first">
                <img src="/images/icons/slideshow.gif" alt="slideshow" class="type slideshow" />
                <a href="/fashion/2010/11/how-to-find-your-bodys-sexiest-dress">How to Find Your Body’s Sexiest Dress</a>
            </li>
            <li class="blurb-links-even last">
                <img src="/images/icons/slideshow.gif" alt="slideshow" class="type slideshow" />
                <a href="/fashion/2010/11/59-perfect-party-dresses-under-100">59 Perfect Party Dresses Under $100</a>
            </li>
        </ul>
    </div>
    <div class="footer">
        <a href="/fashion">more fashion</a>
    </div>
</div>
```

FIG. 29

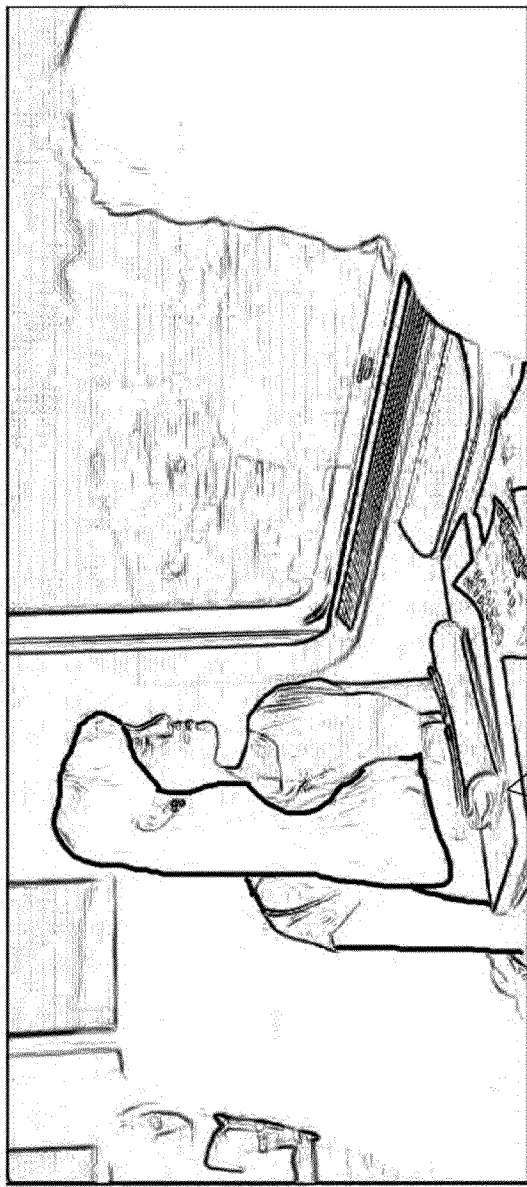
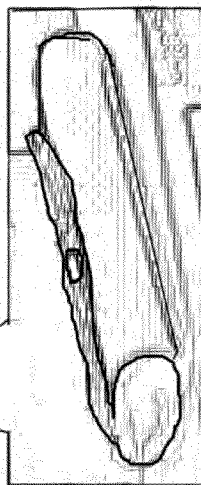
FIG. 30
FIG. 31

```
1  <img x:frame="290000">
2    <object x:name="Purse">
3      <spatiallocation>35,30,50,10"</spatiallocation>
4      <product>
5        <productID>
6          <upc>123456 123456</upc>
7        </productID>
8        <caption>Colleen Atwood Camel Clutch Purse</caption>
9        <srp>$135.00</srp>
10       <title>www.ColleenAtwood.com</title>
11       <link>
12         http:///www.ColleenAtwood.com//catalog//product.jsp?categoryId=140amp;subCategoryId=251amp;productid=40205amp;source=pfamp;ref=ab_aff_pf_k108283
13       </link>
14     </product>
     </object>
   </img>
```

FIG. 32

CONSUMER SHOPPING AND PURCHASE SUPPORT SYSTEM AND MARKETPLACE

CROSS-REFERENCE TO RELATED APPLICATION(S)

The present application derives priority from U.S. provisional application Nos. 61/413,064 filed 12 Nov. 2010, 61/422,819 filed 14 Dec. 2010, and 61/425,483 filed 21 Dec. 2010.

BACKGROUND OF THE INVENTION

1. Field of the Invention

The present invention relates to consumer shopping and purchase support services and, more particularly, to a method and system for assisting in the evaluation of products, pricing and purchase options using a Rich Internet Application (RIA) client that can be download on demand or exist as a locally installed application, accessible directly from any accelerated or researchable page, web based or otherwise, containing product information, to collect and present targeted information from a central data repository(said information having been acquired by specialized software spiders), and consolidate it in a navigational user-interface that combines an array of information tools necessary for consumers to obtain comprehensive shopping and purchase support without leaving the web page they are viewing. A method for adding XML elements containing product-related information into a video stream is also disclosed, to thereby enable a user to ascertain static information about a product displayed in a video stream by selecting it with a pointing device.

2. Description of the Background

The volume of on-line shopping has eclipsed local shopping in recent years as consumers grow more comfortable with electronic commerce. Part of the trend is due to speed and convenience. When a user accesses a typical ecommerce web site with a product request, the request and its associated parameters, such as the product name and model number, are passed from a web server to an application server. The application server performs necessary computation to identify what kind of data it needs from the database. Then the application server sends appropriate queries to the database or other sources. After the database returns the query results to the application server, the application server uses these to prepare a web page and passes it to the web server, which then sends it to the user. In milliseconds, the user receives comprehensive product information including current pricing.

Despite the convenience, consumers are inherently uncomfortable unless they shop around. Even when an ultimate purchase is made locally, consumers very often conduct an online price check and do online research to ensure that their planned purchase is price-competitive and a worthy product. Still, consumers can spend an inordinate amount of time searching for specific products and performing price comparisons. A variety of existing search engines attempt to consolidate the comparison shopping task, including Google™ product search, Yahoo® Shopping, Epinions® and PriceScan®. These search engines break down information into categories-directories or indexes. Directories group retailers under similar categories, such as furniture or electronics. The results of a search will be a list of web sites related to a search term. Indexes use software programs called spiders that scour the Internet, analyzing millions of web pages principally hosted by database-driven ecommerce web sites, social network sites, publication sites and newsgroup postings, indexing all of the words. Depending on their revenue model, many such search engines solicit advertising and preferentially rank their advertisers, thereby eroding consumer confidence. As a result, finding a desirable or low price for an item on the Internet is no easy task. It is still necessary to check multiple websites to ensure that you are getting the price on the best product. The consumer typically finds an appealing product on a retailer website, then checks the manufacturer websites for detailed information on the product, then checks rating websites for user reviews or problems associated with the product, then checks multiple price comparison engines to find the best prices on the product, and then checks auction or reverse auction websites for a street value reference price. This prolonged web browsing process is cumbersome and time consuming, and is fraught with potential pitfalls. Even if a consumer succeeds in finding an item at a good price there is no unified way to measure if it is the best price available, because there is not a non-preferential comprehensive price listing to compare it to. Consequently, there remains a high degree of consumer doubt that such search engines are non-biased and truly comprehensive, giving a truly comprehensive price comparison despite nuances in retailer descriptions and product SKU numbers. Therefore, just because a price comparison website indicates a seemingly low price, the consumer should always be wary. Many price comparison sites lack a deep depth of merchants, or retailer neutrality, or merchant reliability ratings, and so a low price might not actually provide a consumer with a good value. There are, very simply, too many variables and details to keep track of when shopping, and no existing comparison sites which consolidate all variables and details in a clean, useable user-interface. The comparison tools described above individually give only part of the picture, though when used together they can be extremely valuable to consumers.

With the continued growth in use of smart phones and personal data assistants (PDAs), some search engine providers have expanded into mobile comparison shopping. There are now a variety of mobile application price comparison engines, including SMS-based comparison, mobile web applications, and native client applications, which require installation on a computing device before use. Some existing native client applications even offer features such as bar code scanning, such as Barnes & Noble's Bookstore™ iPhone® applet. Users can snap a photo of a book cover, or barcode, which then links to more information about the book. The applet also includes a store locator, recommendations on other books that might appeal, a store events calendar, online purchasing, and video clips of interviews with authors. There is no price comparison or retailer neutrality.

Consolidating all the variables and details needed for truly informed product pricing decisions is a daunting task. Consumers typically do it manually by finding and visiting a variety of product review sites and price comparison engines, and then typing in search terms at each site. Partial solutions exist in the form of multiple price comparison website search engines. A variety of these exist, such as RoboShopper.com. With RoboShopper®, the consumer enters search keyword(s) once and click's a "Shop" button. However, the end result is a listing of multiple comparison and information engines. This approach saves keystrokes because it is no longer necessary to re-enter keywords at multiple sites each specializing in product information, reviews or online price comparison services, as well as local shopping engines (Yellow Pages). However, RoboShopper® is simply a navigation tool that links to these other sites, and it is still necessary to navigate amongst and between multiple sites to glean the necessary information.

What is needed is an entirely different approach, a turnkey system including a central data repository including an Internet based database, spiders that scour the Internet analyzing the millions of product-oriented pages, a server application for classifying and indexing all of the information derived from the spiders, and a Rich Internet Application (RIA) that is accessible directly from any viewed webpage containing product information, which draws information from the central data repository and consolidates it in a navigational user-interface that puts all of the information tools necessary to obtain a comprehensive product picture at the consumers fingertips, without ever leaving the page they were originally viewing.

SUMMARY OF THE INVENTION

Accordingly, the present system is a distributed computerized shopping system including a web-enabled host computer hosting a central data repository that includes an Internet based database, specialized spiders that scour the Internet analyzing the millions of product-specific pages, database-driven ecommerce web sites, social networking sites, newsgroup postings, blogs and other communication feeds, and a server application for classifying and indexing all of the information derived from the spiders to populate the central data repository. In addition, a Rich Internet Application (RIA) client may be either downloaded on demand or installed locally at any of a variety of web-enabled remote client devices (desktop or laptop computers, smartphones, tablet computers, etc.), and in either case can be activated directly from any page or graphic containing a minimal amount of product information via an accelerator, research option or other similar method. The RIA client draws detailed information from the central data repository about a specific product designated on a website visited by the remote computer, and any similar products within the product taxonomy. The client application presents a navigational user-interface on the client device that presents an array of robust information tools necessary for consumers to obtain comprehensive shopping support without leaving the page they are viewing.

The present system also includes a method for identifying objects contained within graphic images, photographic images and image streams (collectively "containing media") for the support of consumer shopping and purchasing. The object identification method comprises adding identifying information to the containing media, subsequently extracting the object information from the containing media to be used by the above-described shopping system or any other system in providing shopping assistance to the consumer. The embedded identifying information may include product identification codes, manufacturer, pricing and other details which could be used by the shopping system. This further simplifies the online shopping experience by allowing consumers to simply click on a raw image of a product that they are interested in, just as it is shown on a catalog page, video stream or otherwise, thereby obtaining comprehensive shopping support as per the above system without leaving the image or video that they are viewing. This will further intensify the online shopping trend while providing a new method for advertisers to reach their target audiences.

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIG. 4 is a screen shot of the maximized native user interface (UI) client application 100.

FIG. 26 is the top half of the front page of an exemplary magazine website which a consumer might visit.

FIG. 27 is a section of a column from that website which currently when clicked on using a pointing device would link to a sub-site about fashion and specific stories there.

FIG. 28 is the section of the XML document which was used to create the section in FIG. 2 in the webpage.

FIG. 29 is the same section of the XML document with the DTD extension to be added (highlighted in blue) to enable full product identification of the shoes displayed.

FIG. 30 is a video frame image from a movie video stream which contains numerous objects/products which could be of interest to the viewer when clicked on using a pointing device. The enlarged inset is an image of a portion of the video image frame that contains a specific object which is also a product, namely a woman's purse.

FIG. 31 is a section of XML which would be used to identify an object within an image. This particular section of XML marks the purse of the woman in FIG. 30 as a sub-element of the image.

FIG. 32 is the previous section of the XML with the DTD extensions to be added (highlighted) to enable full product identification of the purse displayed.

DETAILED DESCRIPTION OF THE PREFERRED EMBODIMENTS

The present invention is a method and system for assisting in the evaluation of products and pricing options by collecting and consolidating information in a central data repository on a host computer system, dynamically downloading a Rich Internet Application (RIA) client from the host system (or by initiation of a local installation of the client) accessible directly from any open page, and collect targeted information from the central data repository and dynamically from other sources through the Rich Internet Application (RIA) client application and consolidating it into a navigational user-interface on the client device that presents an array of robust information tools necessary for consumers to obtain a comprehensive shopping and purchase support without leaving the product web page they are viewing.

Figure 1:
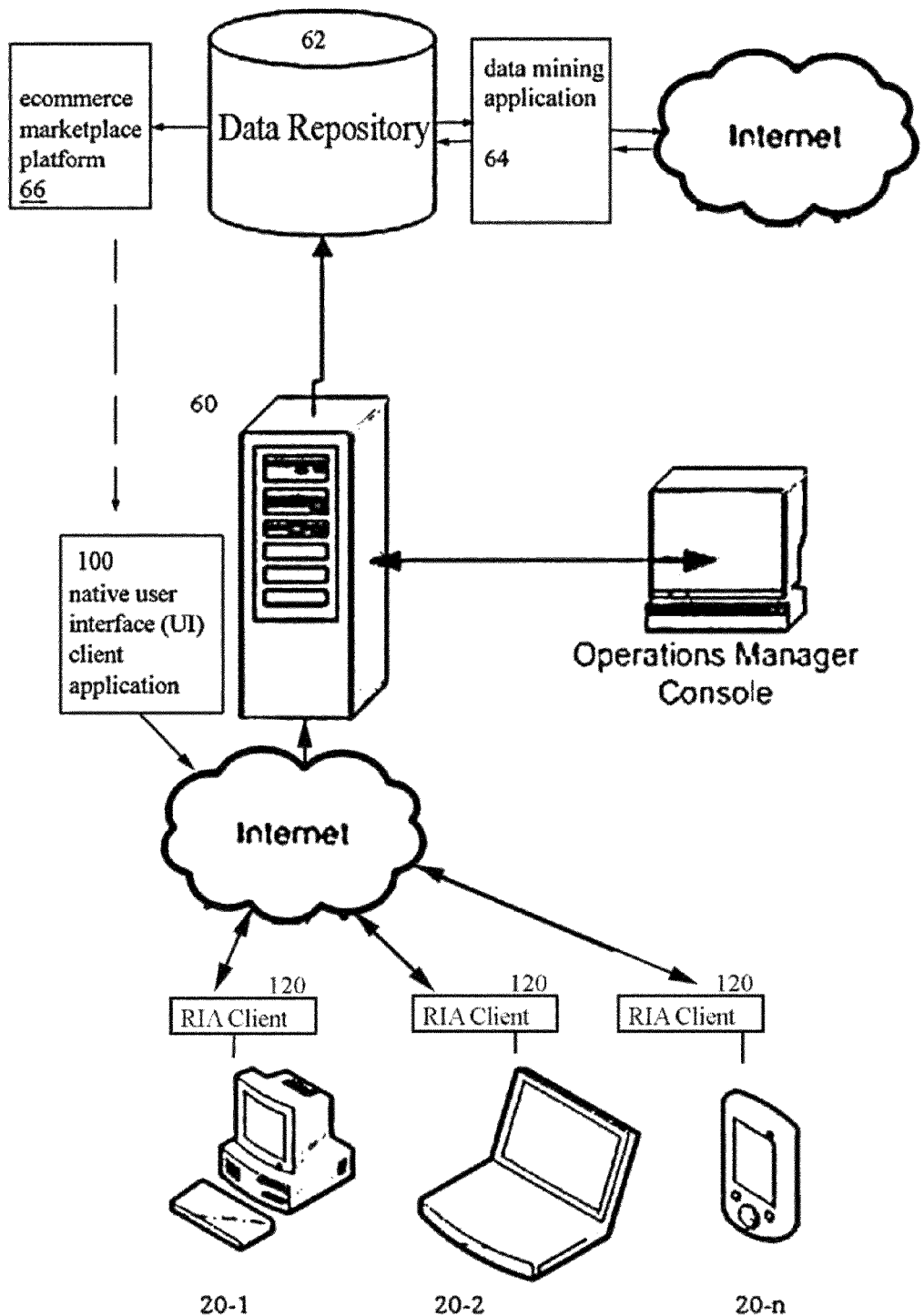
FIG. 1 is a block diagram of the system hardware and software architecture according to the present invention.

FIG. 1 is a block diagram of the shopping system hardware and software architecture according to the foregoing embodiment. The shopping system generally comprises any number of client devices 20-1 ... n which may be cellular phones, personal digital assistants (PDAs), PC Tablets, as well as laptops, PCs, or any other device that includes a user interface, processor and data entry facility, and operating system. Client devices 20-1 ... n are in data communications via wired or wireless network via the Internet to an Internet enabled server 60 maintained by a hosting Application Service Provider (ASP). The ASP also maintains a data repository 62 stored on host server 60 or a separate connected database server. The present system has three software architectural tiers including a front "presentation" tier, a middle "business logic and data access" tier, and a backend data storage tier, with both front and middle tiers presenting multiple interfaces. The front tier comprises a Rich Internet Application (RIA) client. A Rich Internet Application client is a web application that has many of the characteristics of desktop applications, but is delivered by way of a (a) site-specific browser, (b) via a browser plug-in, (c) via an independent sandbox (a third-party mirrored development environment), (d) via extensive use of a scripting language, or (e) via virtual machines. Users first need to install a RIA platform which is a software framework that uses the computer's operating system to download, update, verify and execute the RIA thin client 120. Adobe Flash, Java, and Microsoft Silverlight are currently the three most common RIA platforms. The middle tier comprises (a) a minimal WWW site for installation of the needed accelerators, research options or other components, (b) an operational middle tier providing Software as a Service (SAS) support to the Rich Internet Application (RIA) client 120, (c) an operational middle tier providing SAS facilities to the spiders. The backend tier comprises a conventional database management system (DBMS), a set of software programs that controls the organization, storage, management, and retrieval of data in the data repository 62 stored on host server 60 (or connected database server). The DBMS accepts requests for data from RIA client 120 and instructs the operating system to transfer the appropriate data. The middle tier contains the operative software code that performs installation of needed components, delivery of the Rich Internet Application (RIA) client 120 on demand, the performance of the shopping and purchase support logic, maintenance of the marketplaces, as will be described, and also processes the data gathered by the spiders.

When a consumer in possession of a client device 20 wishes to subscribe, the Internet enabled server 60 pushes out a self-installable RIA client front end 120 which will run on the client device 20 using the native user interface (UI) client application 100. The native user interface (UI) client application 100 may be, for example, a browser like Chrome® 10 or Firefox® 4 or Internet Explorer® 9, or a media player like Windows® MediaPlayer® or RealPlayer® or Songbird®.

The RIA client front end 120 includes Internet communication protocols through which the RIA client front end 120 communicates with the middle tier shopping and purchase support engine and the marketplaces. The RIA client 120 is configured to provide menu choices to the consumer and to display information selectively derived from the Internet enabled server 60 and data repository 62.

Internet enabled server 60 can be implemented on a single server or multiple servers, and can be based on any well-known server environment including one or more central processing units, volatile memory (e.g. random access memory), persistent memory (e.g. hard disk devices) and network interfaces to allow Internet enabled server 60 to communicate over the internet. The nature of Internet enabled server 60 and the communication links to client devices 20-1 ... n may be any combination of architectures that will support interactions between client devices 20-1 ... n and Internet enabled server 60. The network communications links include the Internet as well as appropriate gateways between client devices 20-1 ... n and Internet enabled server 60, using any network infrastructure (e.g. Global System for Mobile communications ("GSM"); Code Division Multiple Access ("CDMA"), Enhanced Data rates for GSM Evolution ("EDGE"), Evolution Data-Optimized ("EV-DO"), High Speed Downlink Packet Access ("HSPDA").) or on wireless local area network ("WLAN") infrastructures such as the Institute for Electrical and Electronic Engineers ("IEEE") 802.11 Standard (and its variants) or Bluetooth or the like.

Internet enabled server 60 also runs a comprehensive data mining application 64 which is programmed to extract patterns from available data in order to populate SQL database in data repository 62. Data mining application 64 deploys a plurality of software spiders, each being an automated socket application that requests data from other Internet-connected servers. These spiders are targeted autonomous robots that collect data based on pre-defined logic and criteria. These specialized spiders are specifically programmed to target product-oriented pages, database-driven ecommerce web sites, social networking sites, newsgroup postings, blogs and other communication feeds, and are further programmed to search product manufacturer URL's and retailer URL's and to gather from those URL's product specifications, marketing information, pricing information, warranty information, and recall and product hazard information. New URL's encountered and available product information are processed by Internet enabled server 60 and saved to the data repository 62. Each new URL is subsequently evaluated for usability and the process is repeated until all available URLs are visited. The spiders are "scrapers" which employ logic and context intelligence geared toward accumulating specific data sets. In this way, the spiders "scrape" the data off the targeted Internet sites to amass a comprehensive product information database, which is classified and indexed to include and differentiate at least:

Product Category
Product Sub-category
ASIN
Uniform Product Code (UPC)
Item name
Manufacturer
Retail distributors
MSRP Description
Features
Details/Specifications
Warranties
Related Products
News
Warnings
Hazards
Disclaimers Further records are compiled for retailers carrying each manufactured product and these records are linked to the manufacturer record. Retailer records include at least:

Retailer Product Name
Current Retail Price
Available Stock by Location

The foregoing product information is mined from the manufacturer when available, is not solicited, and so becomes the basis of a definitive information warehouse for all most all consumer and business products.

Where a given use of the RIA client 120 on the client device 20, and initiation in conjunction with the attached existing native user interface (UI) client application 100, a client device 20 is configured to interact with product information database content available in the data repository 62 which is connected to the Internet enabled server 60. Alternatively, the client application acts traditionally where the given use of the RIA client 120 on the client device 20 is as a locally installed application.

The RIA client 120 is written as a three-dimensional transparent user interface, which is layered or stacked over the all native user interface (UI) client application 100 pages using an illusionary transparent effect, which offers the advantage that information on the native user interface (UI) client application 100 pages may still be read and interacted with. The RIA client 120 offers an additional suite of graphical icons, and text-based interfaces with visual, auditory and/or tactile indicators to fully facilitate delivery of the information and actions available to a user. The present RIA client 120 was programmed with Microsoft Silverlight™, an RIA application framework that integrates multimedia, graphics, animation and interactivity into a single runtime environment, though one skilled in the art will understand that other development platforms such as Adobe Flash or other RIA platforms may be used.

Figure 2:
FIG. 2 is a screen shot of a typical retailer webpage.

The RIA client 120 is configured to provide menu choices to a user according to the particular native user interface (UI) client application 100 page being presented on client device 20. For example, FIG. 2 is a screen shot of a typical retailer webpage which, after searching for "crib", displays an array of possible product selections identified by product name and showing product name and price.

Figure 3:
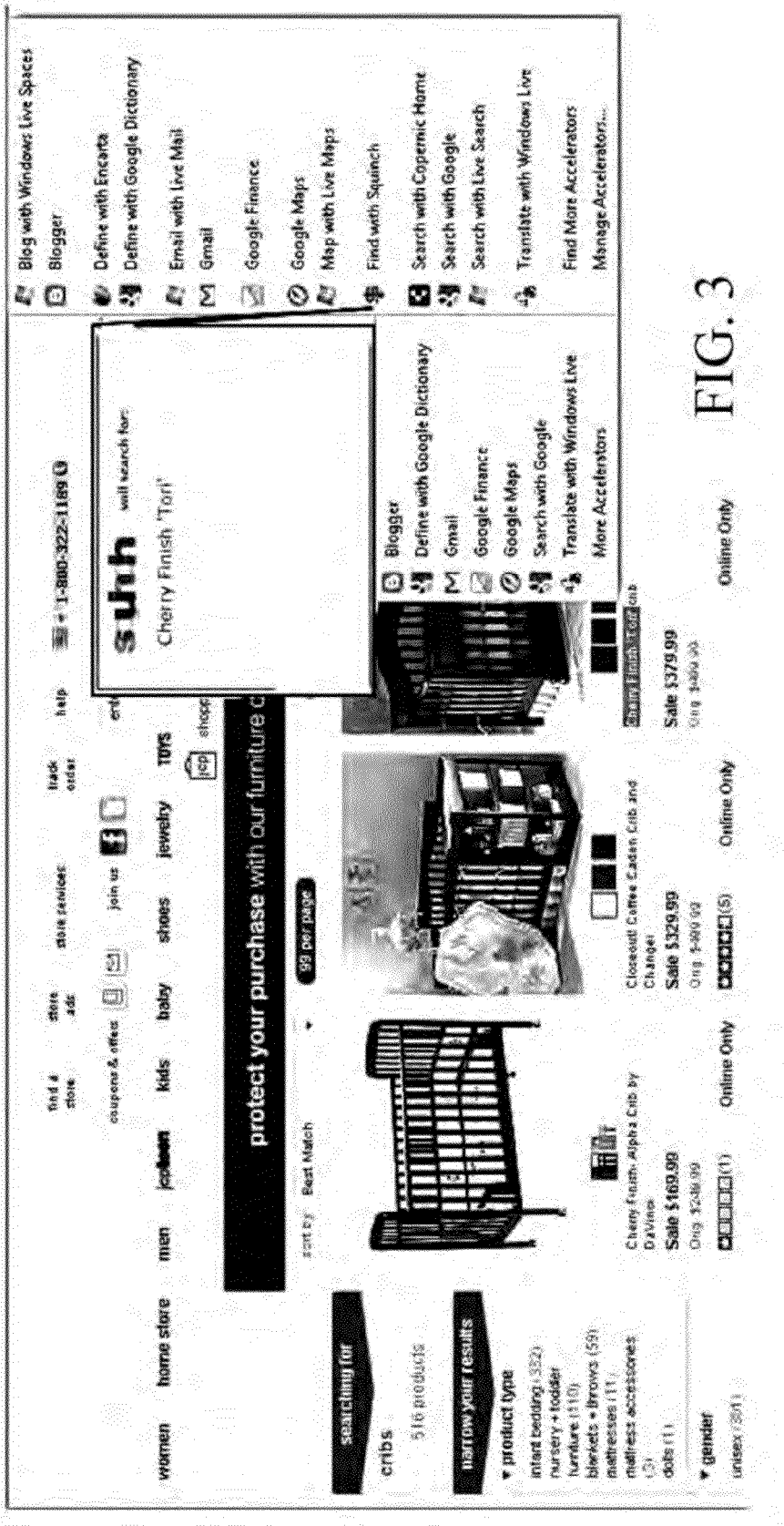
FIG. 3 is a screen shot of the menu for running the native user interface (UI) client application 100.
Figure 4:
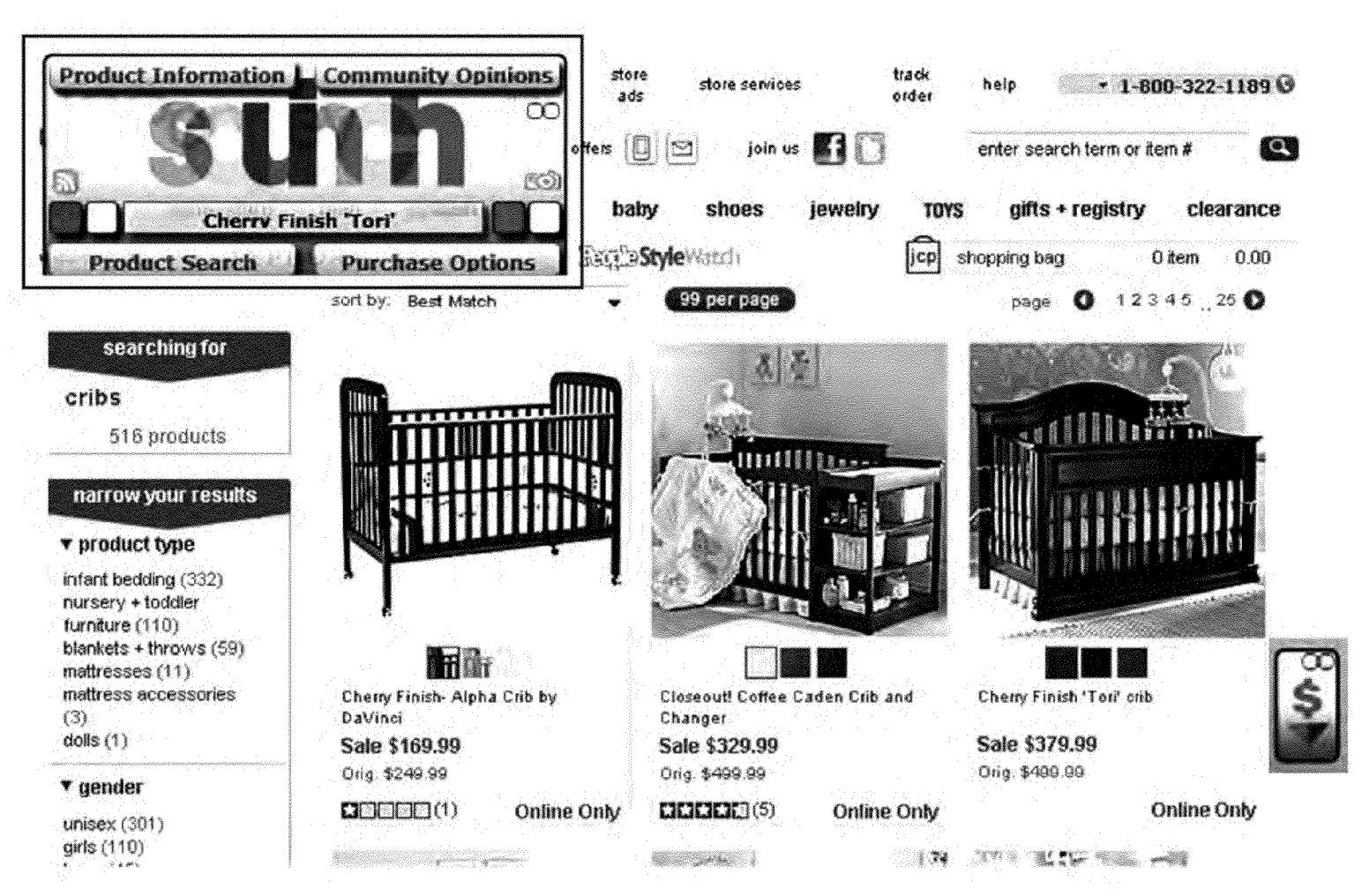

As shown in FIG. 3 once the RIA client 120 is registered as a browser accelerator it is possible by highlighting a product identifier such as "Cherry Finish Tori" and clicking on the blue arrow accelerator icon (or right clicking) above the text to engender a drop-down menu of all browser add-ins or "accelerators." Accelerators in general allow users to create context sensitive menus. The RIA client 120 is shown as a "Find with Squinch" to the right. Clicking on the "Find with Squinch" option initiates the native user interface (UI) client application 100 and engenders the maximized transparent user interface attached at top left to the background web browser as shown in FIG. 4. The transparent user interface provides the user with several immediate options: a "Product Information" button (top left), a "Community Opinions" button (top right), an "RSS Feeds" icon (left center), "Close/Maximize" buttons (upper right), a "Camera" icon (lower right), a "Product Search" button (bottom left), a "Purchase Options" button (bottom right), and a signature series of indicators (green, yellow, red or white) appearing across the lower portion of the user interface. Note that the background web browser remains visible through the transparent user interface.

The "Close/Maximize" buttons (upper right) simply close or maximize the native user interface (UI) client application 100, and the minimized icon appears at lower right.

Figure 5:
FIG. 5 is a screen shot of the Product Information Synopsis screen

Clicking on the "Product Information" button (top left) sends an information request for data stored in the data repository Internet enabled server 60, which returns detailed product, photo, and manufacturer information that is used to populate a "Product Information Synopsis" screen as shown in the screen shot of FIG. 5. This is neutral product information, not marketing information from the retailer website. Directly beneath the "Product Information Synopsis" screen appears a series of supplemental buttons including a "Description" button, "News and Warnings" button, and "Related Products" button. Clicking on the "Description" button engenders a more exhaustive product description. Clicking on the "News and Warnings" button engenders a profile of news articles, product warnings, and product recalls directed toward the product. Clicking on the "Related Products" button displays a listing of similar products for purchase. Clicking on any of these supplemental buttons sends a targeted information request for data stored in the data repository Internet enabled server 60, which returns the appropriate data.

Sometimes a search based on product name retrieves a plethora of possible results. For example, searching "Cherry Crib" will engender thousands of potential products. For this, the consumer is also given additional search options to narrow their initial search results, including "Product Lists", "Words/Barcodes", and "Previous" buttons shown at lower right. The "Product Lists" button allows searching via an indexed tree of product categories and sub-categories. The "Words/Barcodes" button allows searching based on a search string and/or barcode number. The "Previous" button allows for retrieving lists of previous search criteria used or products viewed.

Figure 6:
FIG. 6 is a screen shot of the Words/Barcodes search screen.

The "Product Lists" is an indexed tree of product categories, product lines, products and specific models that the consumer can navigate to find a desired product. Alternatively, as seen in the screen shot of FIG. 6, the consumer can search (or narrow a search) using the "Words/Barcodes" button, which engenders a dialogue that allows text entry of keywords, product UPC, or manufacturer SKU number. A series of check boxes below allow further specification of "Exact Match", "UPC", "Model No.", or "Product No." Once the appropriate keywords are entered, a search request is generated and transmitted to the data repository Internet enabled server 60, which searches its comprehensive database and returns the requested information to the transparent user interface, where results are displayed.

Note the "Search using Camera" icon at top right. This feature allows the consumer to upload a photo of a product barcode for a barcode-based search. If the client device 20 is a cellphone or laptop with integrated camera, they need only snap a photo of a barcode to send the barcode request for data stored in the data repository Internet enabled server 60, which returns the appropriate data based on the product barcode.

Figure 7:
FIG. 7 is a screen shot of the Search Using Camera dialog.

FIG. 7 is a screen shot of the "Search Using Camera" dialog, which display camera connectivity status and prompts the user through a series of camera actions, ultimately displaying the photographed barcode directly. This feature is helpful when retailers rename the manufacturer's products.

Figure 8:
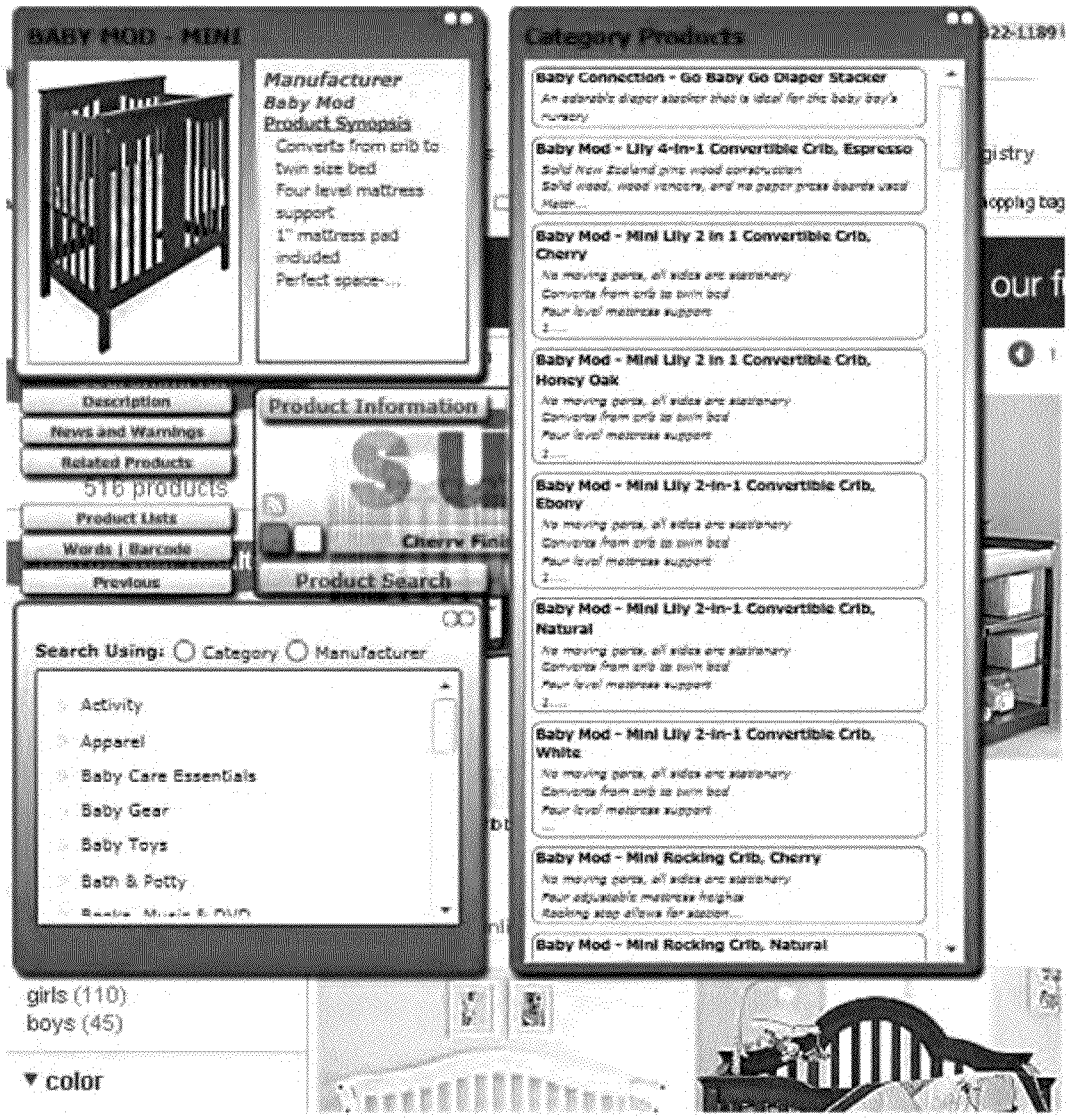
FIG. 8 is a screen shot of the Search using Product Lists dialogue.
Figure 9:
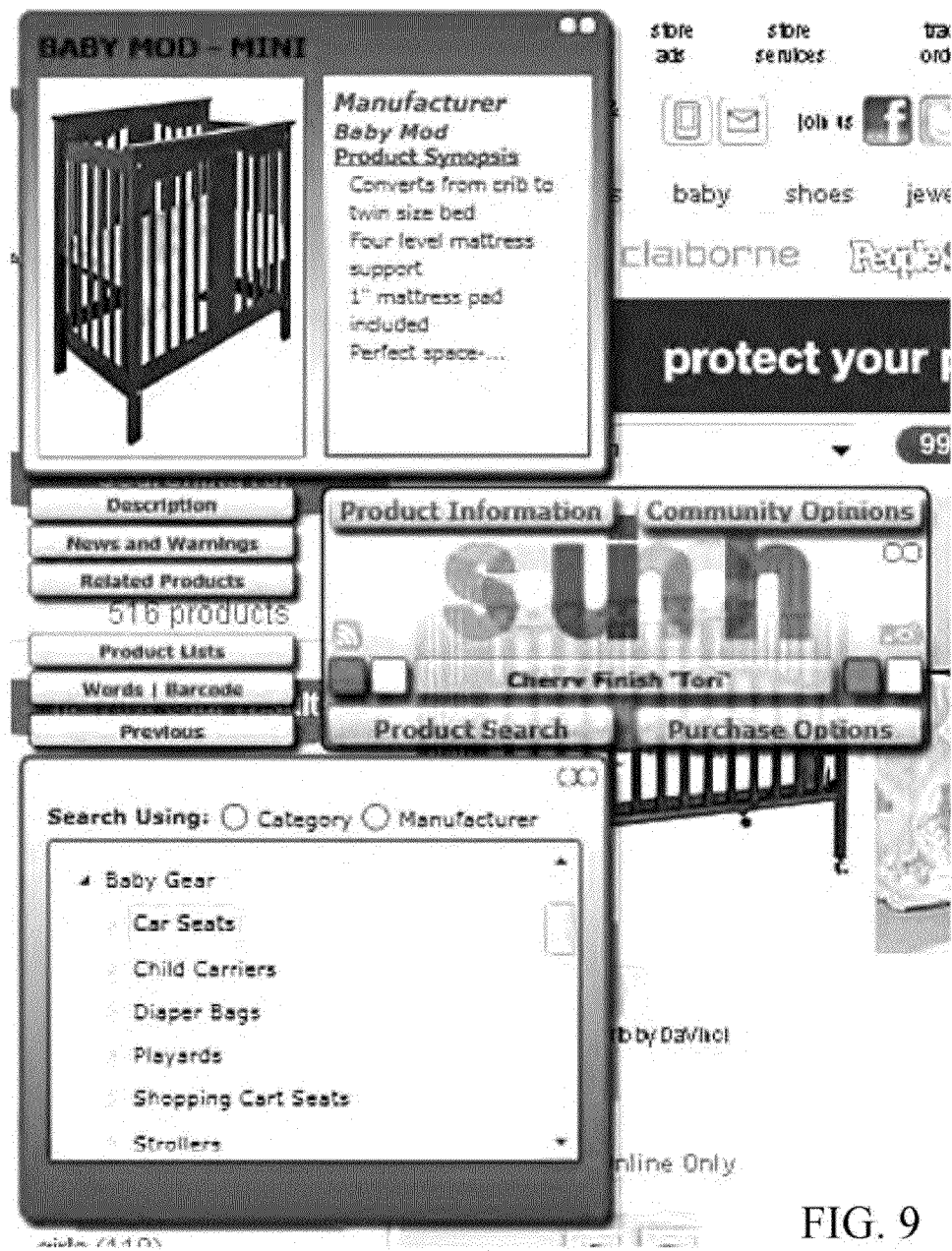
FIG. 9 is a screen shot of the indexed product line as in FIG. 8.

FIG. 8 is a screen shot of the search using "Product Lists" dialogue, which allows the consumer to search based initially of product category or manufacturer (check boxes lower left). Checking product manufacturer engenders a selectable list of product manufacturers, while checking product list engenders a categorical listing as shown. As the consumer clicks on a product category arrow, the index expands to show all product lines within that category (see FIG. 9 . . . Baby Gear>>Car seats), all products within that product line (Car seats>>Booster Car Seats), and all models of products.

Figure 10:
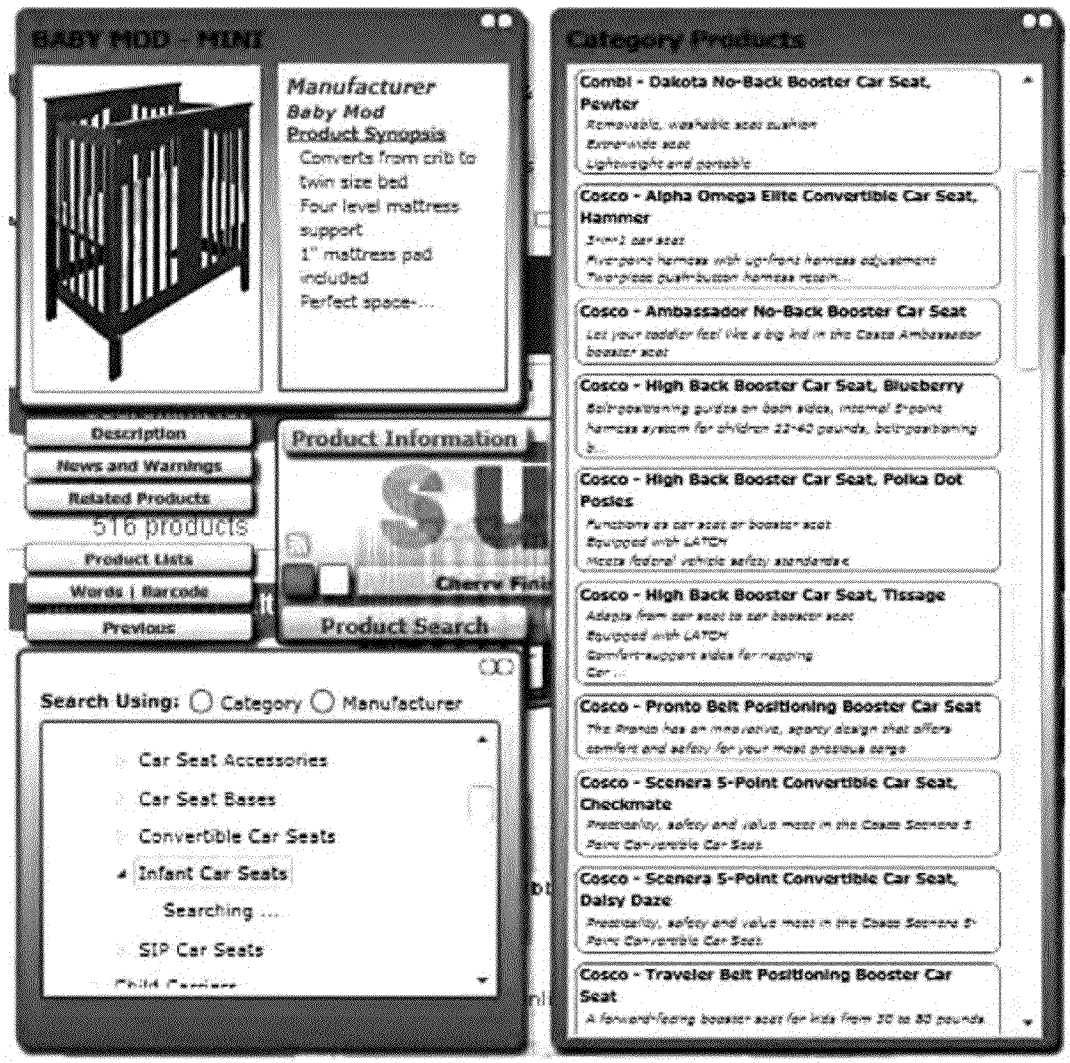
FIG. 10 is a screen shot of exemplary search results.

As shown in FIG. 10, when each index entry is selected a search request is sent to the data repository 62 via Internet enabled server 60, which returns collected information back to client device 20 and the transparent user interface displays all responses in the results screen at right, with synopsis information. This gives the consumer a ready way to search, or to narrow the myriad results of a nebulous text search using an indexed classification system. The index is maintained in the data repository Internet enabled server 60, and the transparent user interface merely sends targeted requests thereto and receives/displays responses.

Figure 11:
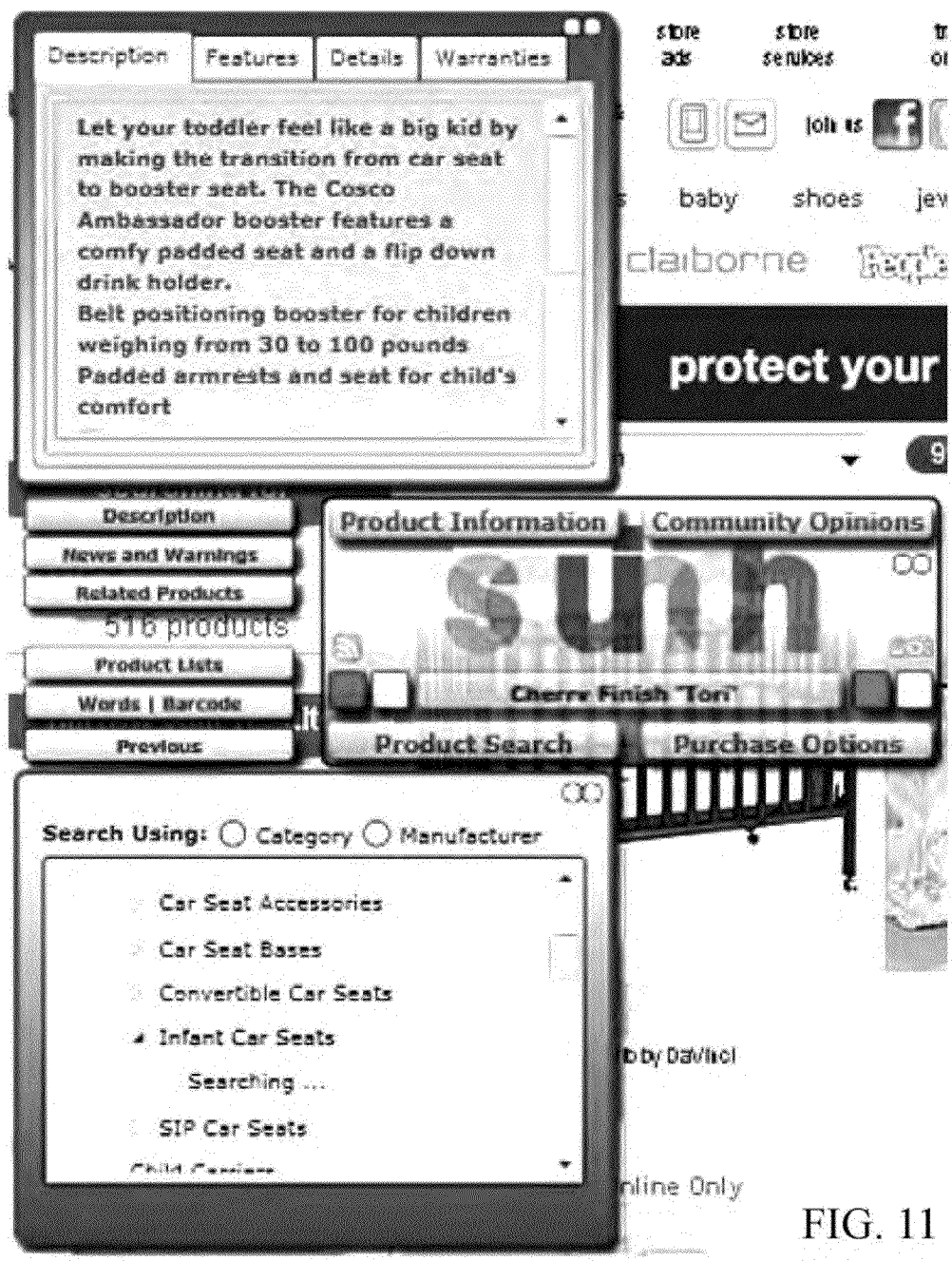
FIG. 11 is a screen shot illustrating the detailed information displayed for that product.

When the consumer has narrowed their search and finally selects a specific product, FIG. 11 is a screen shot illustrating the detailed information displayed for that product. The detailed product information is displayed in flip-chart format including tabs for "Description", "Features", "Details", and "Warranties". These tabs display the retailer description, manufacturer features, details, and available warranties.

Figure 12:
FIG. 12 is a screen shot of the search archive window attained by pressing the "Previous" button.

All searches including search parameters are archived. The "Previous" button presents a list of previous products viewed or searches made. FIG. 12 is a screen shot of the search archive window attained by pressing the "Previous" button. A chronological listing of previous product searches is displayed by product number, and the user can select whether the display includes previously searched products r previously viewed products. This feature allows a consumer to quickly resume an earlier research effort.

Figure 13:
FIG. 13 is a screen shot of the News, Health, Hazards and Disclaimers dialogue.

The consumer can then click on the "News and Warranties" button, and "News and Warranty" information is displayed in flip-chart format including tabs for "News", "Health", "Hazards" and "Disclaimers". As seen in FIG. 13, each index card is populated with "RSS Feeds" regarding that particular product and the selected information category (News, Health, Hazards and Disclaimers) collected and stored in the data repository Internet enabled server 60.

Figure 14:
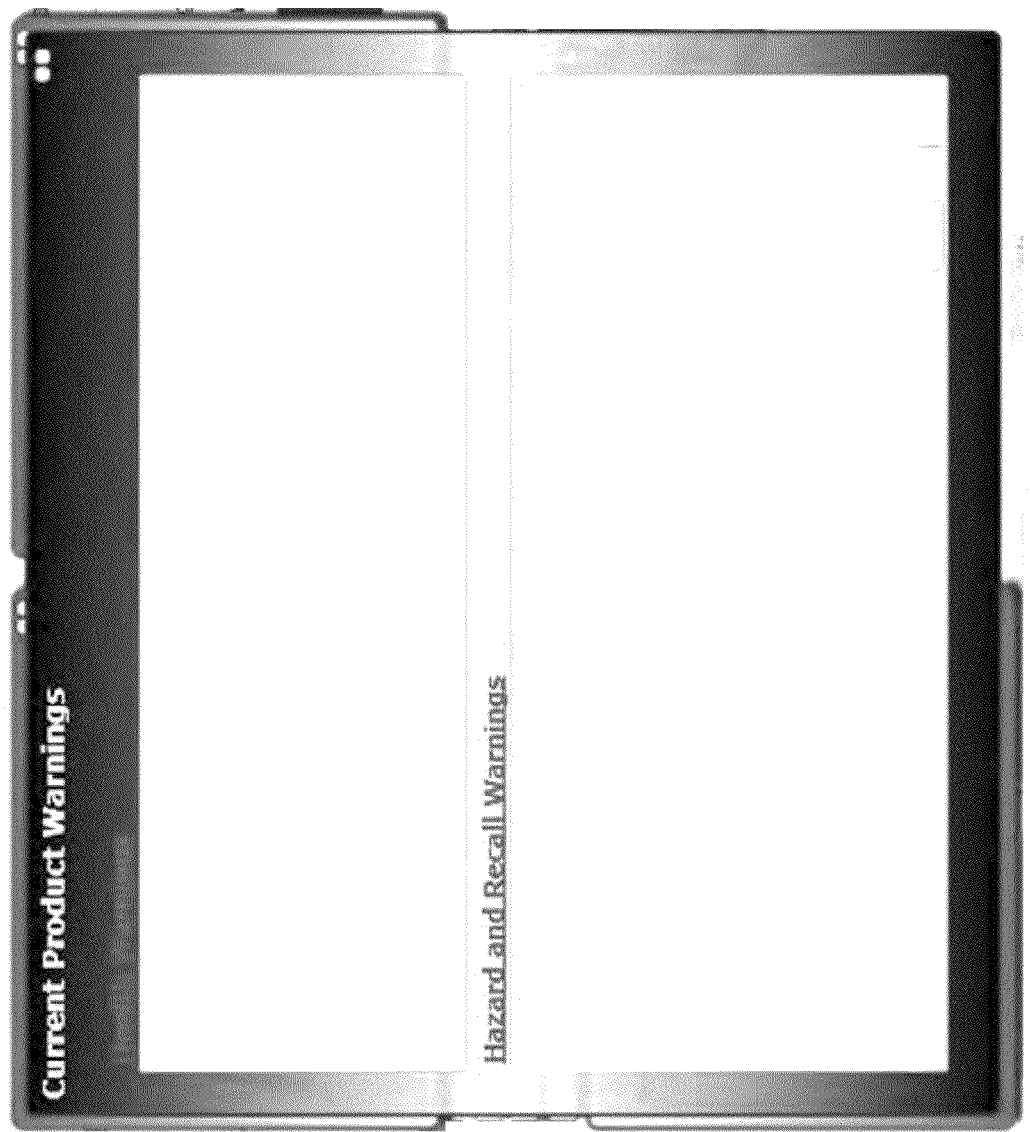
FIG. 14 illustrates a screen shot of the Hazards and Disclaimers screen.

FIG. 14 illustrates a screen shot of the "Hazards and Disclaimers" screen, which aggregates Current Product Warnings including Health Warnings and known Hazards and Recalls.

Figure 15:
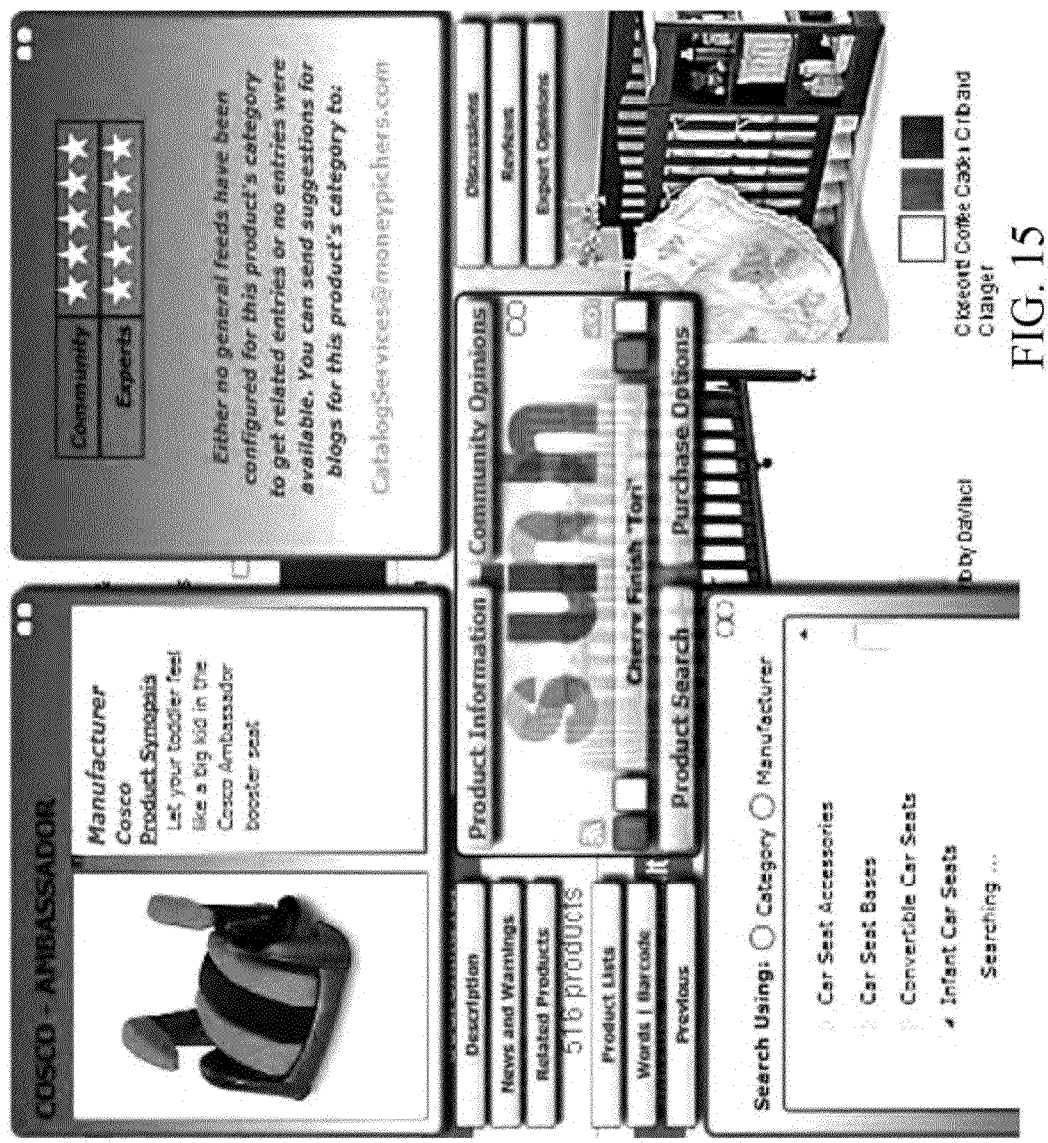
FIG. 15 is a screen shot of the Community Opinions screen.

Clicking on the "Community Opinions" button (top right) engenders the review dialogue of FIG. 15, which presents both users' and experts' reviews aggregated from other product review sites.

Figure 16:
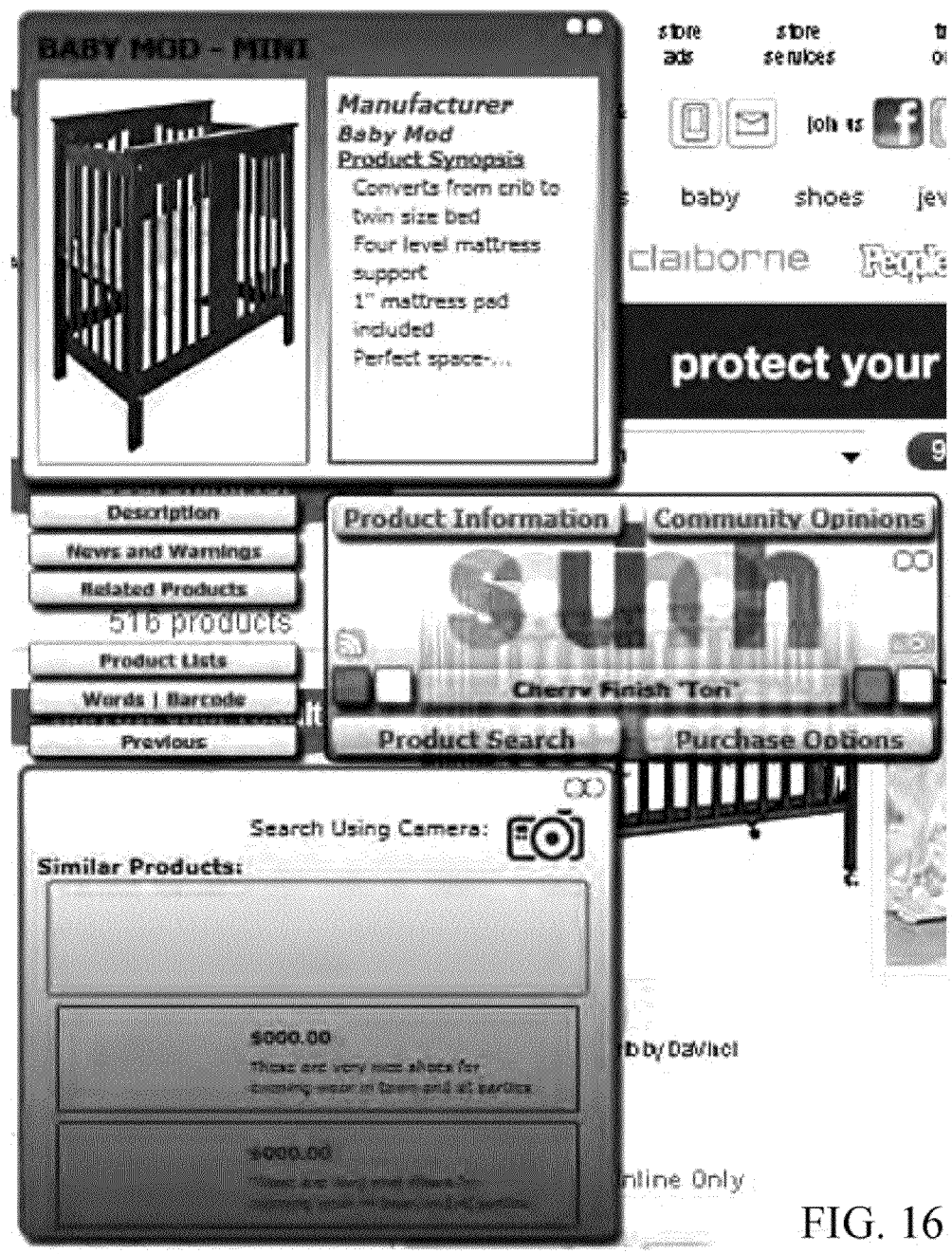
FIG. 16 is a screen shot of the Similar Products Listing.

FIG. 16 is a screen shot of the Related Products Listing attained by clicking on the "Related Products" button of FIG. 5. The Related Products Listing displays a listing of alternative products for purchase, with best available prices so that the consumer can weigh the alternatives.

Referring back to FIG. 5, the "RSS Feeds" icon (left center) allows the user to subscribe to an RSS feed based on the current search parameters. When pressed, the feed is added to the Common Feed List of web-browser application 86. As part of the RSS support platform in most conventional web browsers, users can subscribe to RSS feeds within the browser. When the user subscribes to a feed, it is added to the Common Feed List. The native user interface (UI) client application 100 imports feeds from the Common Feed List. Updated information from the search parameters is automatically downloaded directly to the client device 20 and can be viewed in the native user interface (UI) client application 100 and other programs.

Figure 17:
FIG. 17 is a screen shot of the Current Product Purchase Options screen.

The series of indicators (green, yellow, red or white) appearing across the lower portion of the user interface connote one of the most robust features of the present system, and provide a tool that facilitates the most comprehensive shopping and purchase support possible without leaving the product web page. These indicators may also be associated with auditory and tactile indicators. When the consumer has identified a particular product using any of the afore-mentioned search tools, one or more of these indicators may be blinking in a recurring manner. The indicators represent the outcomes of a rules-based artificial intelligence engine that mines data directly from the open page and compares it to data mined and stored in the data repository 62 using the shopping and purchase support logic of Internet enabled server 60. If the red indicator is blinking, this means that Internet enabled server 60 has found the same product at a lower price and the consumer should not purchase from the retailer website on current display or at the physical location of the consumer if being access from a mobile device with GPS capabilities and the product information has been accessed via barcode scanning or direct query. If the green indicator is blinking, this means that the data repository Internet enabled server 60 has not found the same product at a lower price and the consumer may freely purchase from the retailer website on current display or at the physical location of the consumer if being access from a mobile device with GPS capabilities and the product information has been accessed via barcode scanning or direct query with confidence that this is the best price available. The consumer may click on the red indicator to engender the "Current Product Purchase Options" screen shown in FIG. 17, which presents a listing of all the product purchase options found at a lower price by the data repository Internet enabled server 60. If the consumer sees a purchase option that might provide better value he may click through any listed option to go to the seller's website. If the yellow indicator is blinking, this means that the ASP host marketplace/exchange platform can offer the product at a better price than any retailer website referenced.

As described in more detail below, the data repository Internet enabled server 60 hosts an ecommerce marketplace platform 66 using a number of different marketplace formats to compete for sales to the consumer referred to as a "MoneyPincher". In FIG. 2, the hosted marketplace/exchange platform 66 run by Internet enabled server 60 is an e-commerce system integrated with the native user interface (UI) client application 100 that allows each consumer to suggest the price they want to pay, and the type of marketplace/exchange that they wish to participate in.

There is an individual acquisition format, a social (friends-only) group acquisition format, and a public group acquisition format. Both individual and group formats rely on dynamic generation of conditional purchase offers (CPOs), whereby the hosted marketplace/exchange at Internet enabled server 60 solicits bulk purchases for popular products, and then finds a supplier, either subscribed or via discovery by a spider and subsequent solicitation, willing to accept the required price to complete the sale to the consumer (s) given the variables of the acquisition format. All individual and group purchase options are called "Pinches". Pinches may be combined in variations resulting in multiple CPO's being issued, but not all CPO's may be result in a final Purchase Order (PO).

When the consumer sees a blinking yellow indicator this connotes that an active Pinch exists for the selected product at a lower price. By depressing the blinking yellow indicator, the consumer is presented with the "Active Pinch" screen of FIG. 18. The "Active Pinch" screen displays a listing of all active Pinches for the selected product, along with bidding start date, desired closing date, desired price, last bid, group type, and Pinch type (see below). If the user sees an attractive active pinch, he/she can click on the listing and subscribe to the Pinch. They become part of the active pinchers group for that product. Assuming that the total quantity sought by the pinchers group exceeds the minimum purchase quantity by the desired closing date, the CPO is accepted and the hosted marketplace/exchange at Internet enabled server 60 exercises the conditional purchase, automatically collects payment from the successful Pinchers at the discounted price, and transmits drop-shipment orders along with payment to the subscribed supplier. The present CPO marketplace/exchange system utilized by the hosted marketplace/exchange at Internet enabled server 60 is similar to conventional systems such as disclosed in the Priceline.com U.S. Pat. No. 5,794,207, and it is the particular way that it is integrated with the native user interface (UI) client application 100 (triggering blinking yellow indicator) that gives the consumer a robust purchasing tool and valuable fingertip information about the street price of many popular products.

Figure 19:
FIG. 19 is a screen shot of the Completed Purchase screen.

As seen in the "Completed Purchases" screen shot of FIG. 19, the consumer may also view a "Completed Pinches" screen displaying a listing of all successfully-completed Pinches for products, along with bidding close date, last bid, price, group type, Pinch type, and quantity of product ordered. This allows the user to keep track of Pinch purchases.

The blinking white indicator connotes that a product warning or recall exists, and clicking on the white indicator directs the consumer to the profile of news articles, product warnings, and product recalls directed toward the selected product as described above with the "News and Warnings" button.

Figure 20:
FIG. 20 is a screen shot of the Prices, Purchase and Coupon buttons.
Figure 21:
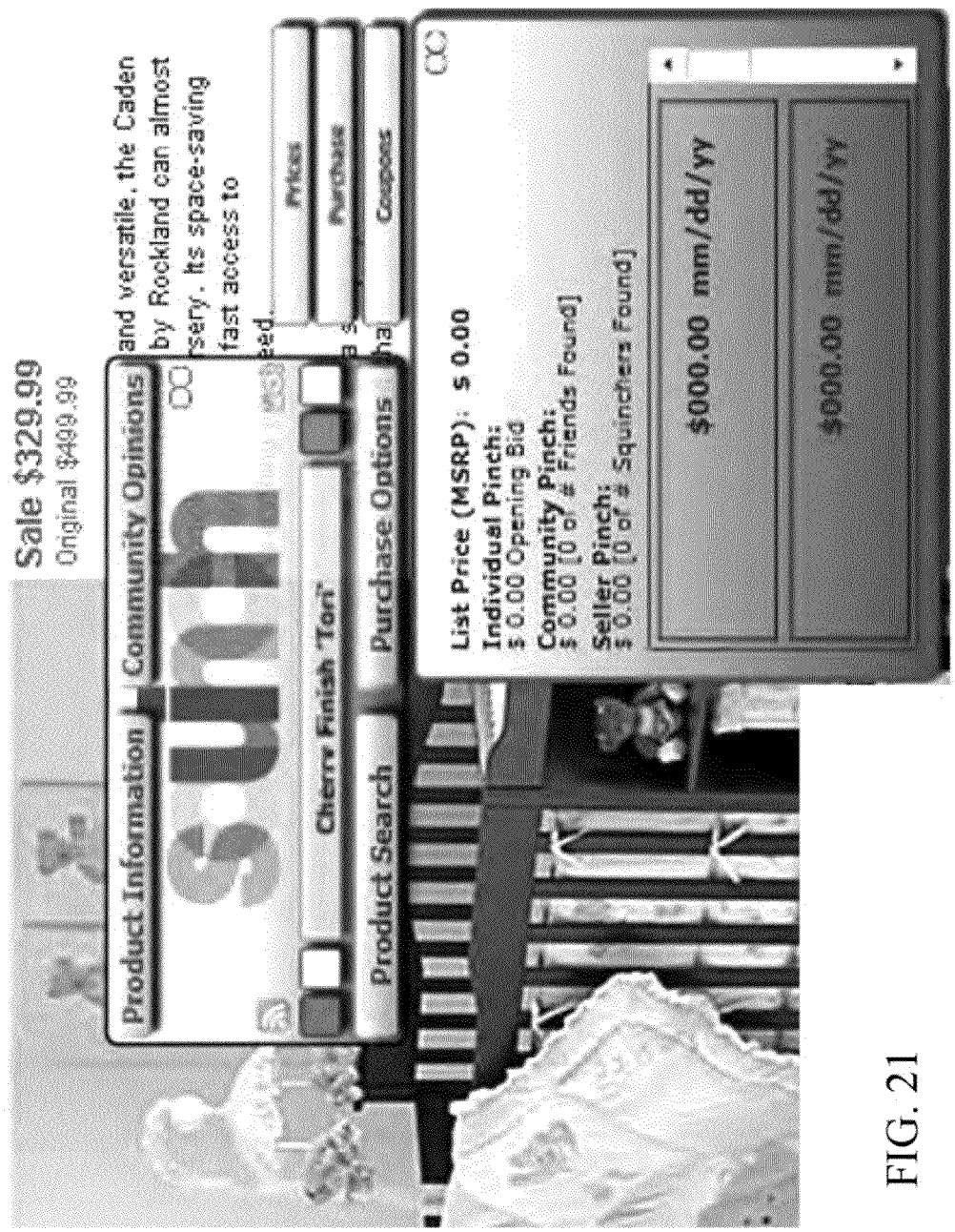
FIG. 21 is a screen shot of the Prices Display.
Figure 22:
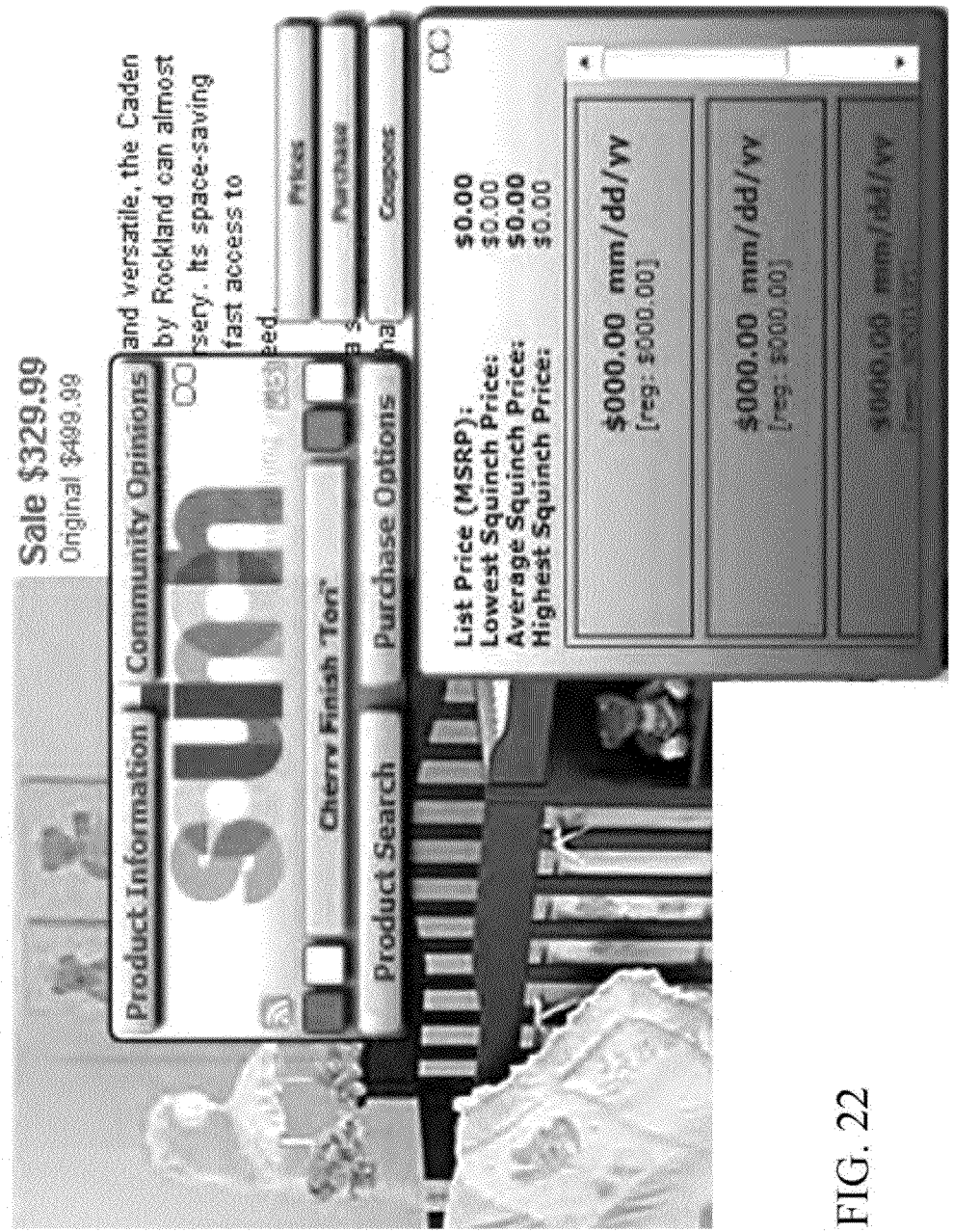
FIG. 22 is a continuation of the Prices Display of FIG. 21.

Referring back to FIG. 5, the user may elect to explore other purchase options (including Pinches) and can press the "Purchase Options" button. This engenders the screen shot of FIG. 20, which displays "Prices", "Purchase" and "Coupon" buttons (right center). Pressing the "Price" button displays active Pinch pricing information. There are three types of Pinch marketplaces/exchanges: Individual, Friends and Public Group. In an individual Pinch, the consumer submits their own desired price and quantity. In Friends or Public Group marketplaces/exchanges, the consumer is a part of a specific buying cooperative with other friends or members of the public, respectively, seeking a specific desired price based on the group size. All three Pinch marketplaces/exchanges are hosted at Internet enabled server 60 which relies on an e-commerce system integrated with the native user interface (UI) client application 100 that allows each consumer to suggest the price they want to pay. As seen in FIG. 21, the Prices button displays current MSRP, Individual, Friends and Public Group pricing information for the selected product under all active Pinch formats. As the user scrolls down they see running statistics including Lowest Squinch price, Average Squinch price, and Highest Squinch price over time, as illustrated in FIG. 22.

Below the "Prices" button, the "Purchase" button is used to create and/or enroll in Pinch format purchase options and drops down a Pinch menu which allows check-box selection between the Type of Pinch desired and the Pinch action desired.

Given the consumer's selection between Individual, Friends or Public Group marketplaces/exchanges, the consumer may also specify whether they wish to create a new Pinch, or join an existing Pinch.

Figure 18:
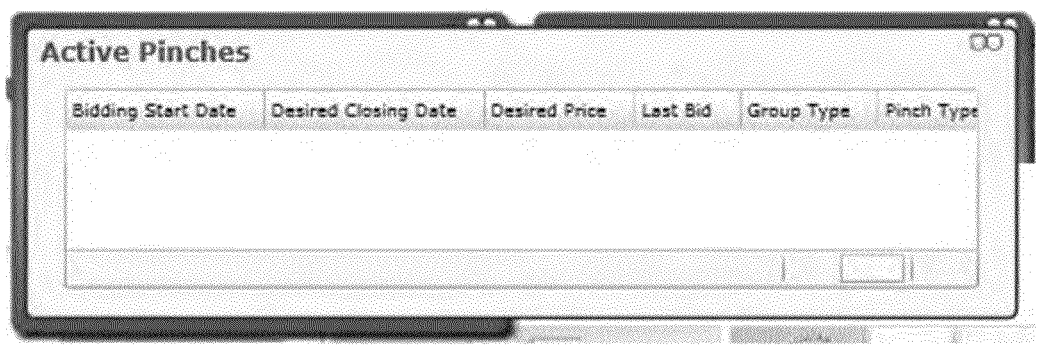
FIG. 18 is a screen shot of the Active Pinch screen.
Figure 23:
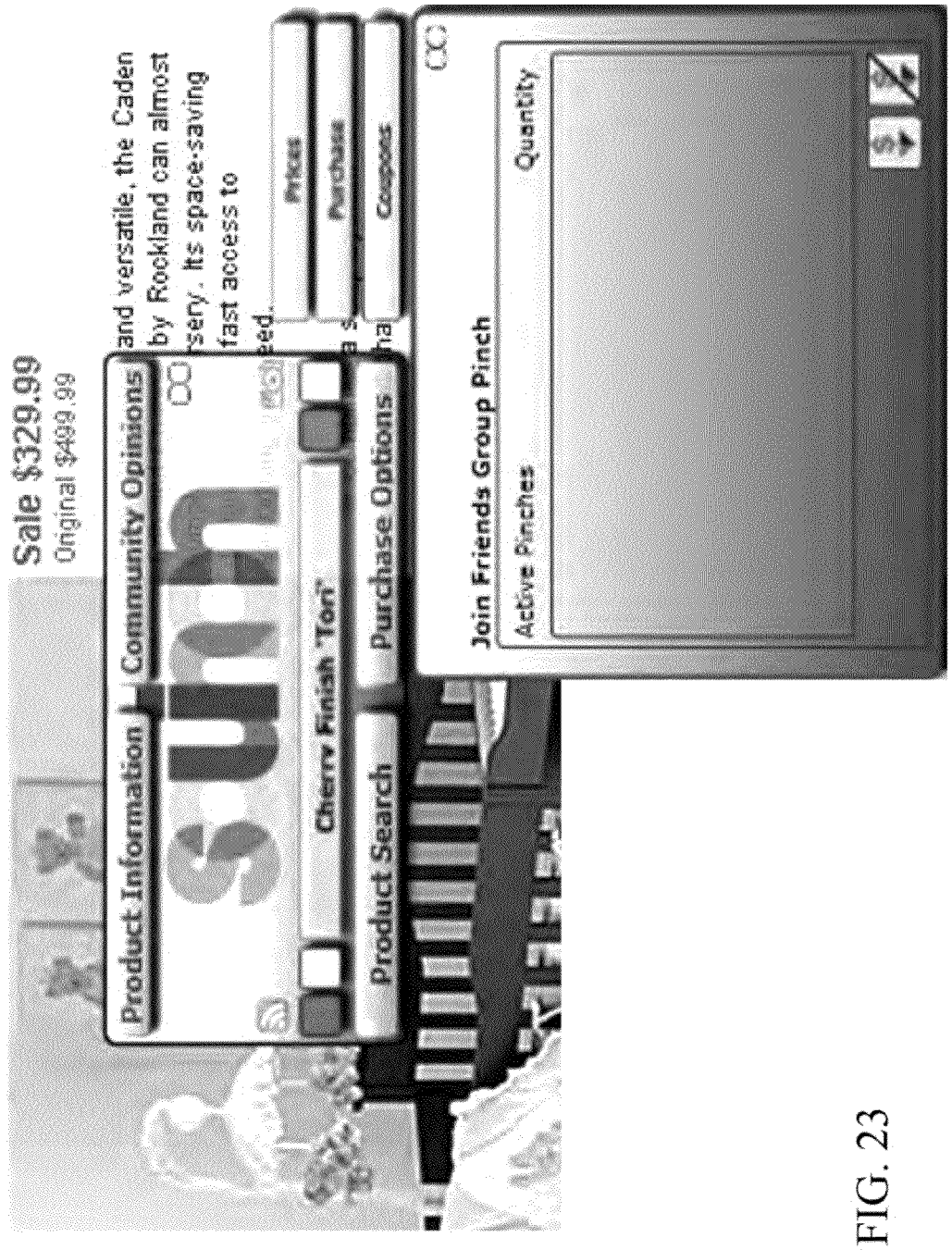
FIG. 23 is a screen shot of the filtered Active Friend's Pinch screen.

If the user wishes to join a Friends Group Pinch, this will engender the screen shot of FIG. 23 which is essentially a filtered Active Pinch screen as in FIG. 18 but displaying only the consumer's circle of friends. The hosted exchange at Internet enabled server 60 maintains a social network service by which all registered consumers may create a personal profile, add other users as friends and exchange messages, including automatic notifications when they update their profile. Groups of friends can join the buying cooperatives by taking advantage of Friend Pinches, but only pre-designated friends (who have indicated and accepted previous invitations sent through the hosted marketplace/exchange at Internet enabled server 60) may join a Friends Group Pinch. The "Active Friends Group Pinch" screen displays a listing of all active Friends Group Pinch Pinches for a selected product, along with bidding start date, desired closing date, desired price, last bid, group type, and Pinch type (Friends Group Pinch). This allows registered users to share the values that they have uncovered with the present system and share purchase with their designated friends. If the user sees an attractive bidding pool amongst friends, he/she can click on the listing and subscribe to the Pinch. They become part of the limited bidding pool for that product.

If the user wishes to join a Public Group Pinch, the process is very similar and a filtered "Active Pinches" screen is shown displaying Pinches open to all registered members (not just friends).

Figure 24:
FIG. 24 is a screen shot of the Individual Pinch subscription screen.

If the user wishes to join an Individual Pinch, the process is again similar and engenders the Individual Pinch subscription form of FIG. 24. The consumer specifies desired quantity, Units, Desired price, Ship to Address, Delivery Method, and requisite closing date. The requisite closing date is selected by a calendar (left center) in conjunction with a series of check-boxes connoting different things: Quick Pinch requires a substantially instantaneous purchase offer/acceptance based on standing CPO's; Closing Date requires Pinches to close by a certain date specified; Need by date allows for shipping delay; and Open Date leaves the close open-ended. Once specified the filtered "Active Pinch" screen subscribes the consumer and awaits the result of the reverse auction format.

Figure 25:
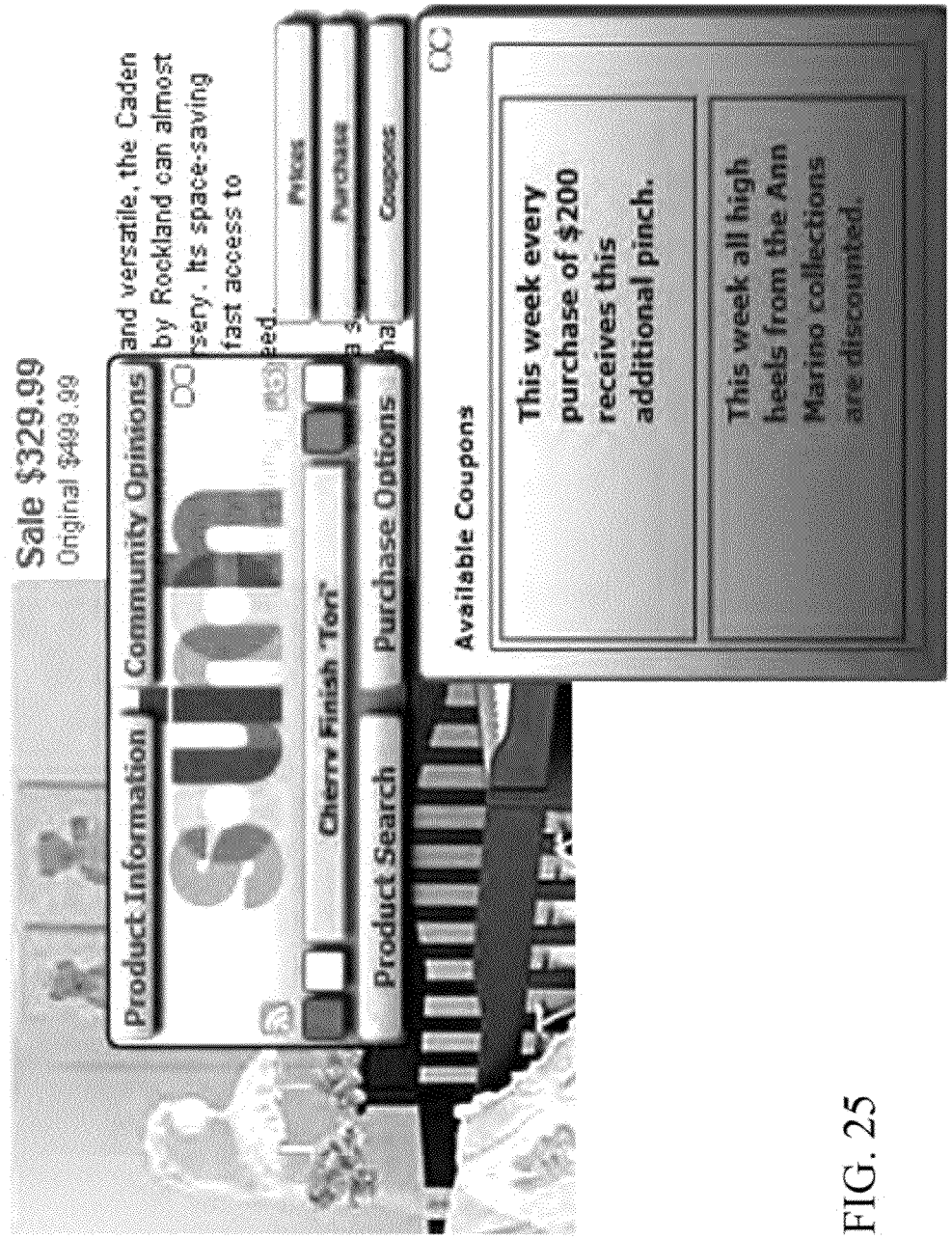
FIG. 25 is a screen shot of the Coupons Screen.

FIG. 25 is a screen shot of the "Coupons" screen which is attained by depressing the "Coupons" button of FIGS. 21-24. The "Coupons" screen presents both coupons aggregated from other coupon sites as well as manufacturer and retailer coupons mined from applicable feeds.

It should now be apparent that the above-described system including hardware and software architecture provides Rich Internet Application (RIA) client accessible directly from any page, which draws information from a central data repository and consolidates it in a navigational user-interface that puts all of the information tools necessary to obtain a comprehensive product picture at the consumers fingertips, without ever leaving the product web page they were originally viewing. This adds greatly to consumer confidence during the shopping experience.

Merchants occasionally advertise products via digital media in which a product is contained in the midst of digital graphic, photographic and video image(s) or streaming video without any associated XML/HTML code or tags identifying the depicted product. Thus, for example, a merchant web page will depict a catalog page containing a product image (an "embedded" image), or will display a streaming video in which a product is depicted. Without some associated XML/HTML code, metadata or tag (containing a product UPC code, link or otherwise), the above-described system would have no way of identifying the product within the image/ video and would have no means for drawing information from the central data repository for use in its user-interface. To overcome this issue, the present system includes a method of object identification, including adding identifying information to the containing media (e.g. web site, digital publication, television broadcast or movie), and subsequently extracting said object information from the containing media to be used by the above-described or any other system in providing assistance.

In an embodiment designed for XML static document or document streams which have an embedded image, the present method adds XML elements containing a limited amount of product-related information to the XML static document or document stream which has an embedded image, to thereby enable the present system to identify an object/product contained within that image when selected by a pointing device.

Figure 26:
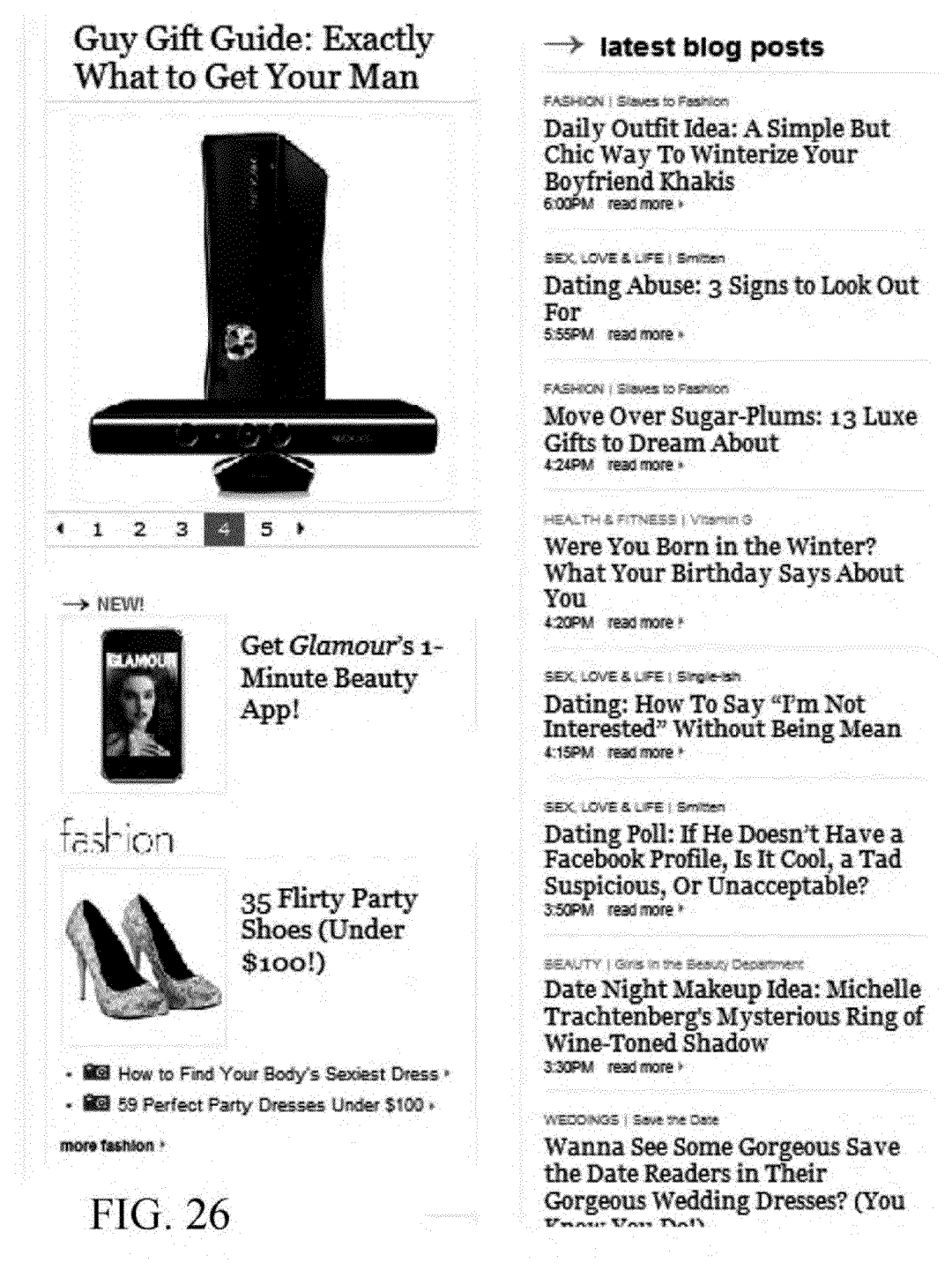

FIG. 26 is the top half of the front page of an exemplary magazine website which a consumer might visit, which illustrates the results of conversion of an actual XML static document to web page by a web browser (because of the actual page size, only the top of the page was captured by the snapshot of the screen).

FIG. 27 presents a subset of the page of FIG. 26 with a photographic image containing of a pair of women's shoes. Assuming that a consumer is browsing the web pages of FIGS. 26-27 and desires more information on those shoes, in accordance with the present invention they need only position their pointing device on the image and click to initiate the object/product's identification. The method is manifest in the code.

FIG. 28 presents the section of XML document responsible for definitions of the subset of the original page with the photographic image of the shoes as in FIG. 27. This section is a composite of Document Type Definitions (DTDs) and XML elements which a browser reads and subsequently composes the section presented. In FIG. 28 the following XML element was present in the actual XML document (the second element is represented in its abbreviated form, "/>", at the end of the example):

```
<img src="/images/fashion/2010/11/1119-06-party-shoes-sparkles-gold-pump-
michael-antonio_tl.jpg" alt="party shoes sparkles gold pump michale antonio"
class="sololmg"/>
```

The foregoing XML element is a pointer to the image source file. The present invention extends the XML element pair <img></img> for the definition of images. More specifically, the present invention extensions adds at least six new XML element pairs and up to five optional element pairs. The six primary representative XML elements pairs which are used are:

<product> </product> [this element pair is a container identifying the DTD extension];

<spatiallocation> </spatiallocation> [this element pair contains the relative spatial coordinates of the product in the image];

<productID> </productID> [this element pair is a container for the product identification details]; and <upc> </upc> [this element pair contains the UPC code of the product];

<manufacturer> </manufacturer> [this element pair contains the manufacturer's name];

<id> </id> [this element pair contains the manufacturer's product number];

The five supplemental (optional) representative XML elements pairs which can be used are:

<caption> </caption> [this element pair contains a caption which could be used in a popup];

<srp> </srp> [this element pair contains the suggested retail price];

<title> </title> [this element pair contains a title for use in list of selected products];

<link> </link> [this element pair contains a link to more details about the product];

<syncframe> </syncframe> [this element pair contains the image frame number of the associated video stream to which this DTD extension applies].

FIG. 29 presents the original section of the XML document extended by the object/product identification information above (highlighted) thru the insertion of the previous XML element pairs and a sample of possible content in context of those pairs with the exception of the <syncframe> element (which applies only to video image streams). The primary representative XML elements are as follows:

Line 1 <product> identifies the DTD extension beginning, and line 11 the ending.

Line 2 <spatiallocation> 5,28,5,25 identifies the relative spatial coordinates of the product in the image.

Lines 3-5 <productID> contain the product identification details, which are here indicated at line 4 to include the UPC code of the product <upc>123456 123456</upc>.

Line 6 contains the product caption <caption>Michael Antonio Glitter Pump</caption>;

Line 7 contains the price <srp>$35.99</srp>;

Line 8 contains a title for an abbreviated representation of the link in the next line in a list of selected products: title>www.ardenb.com</title>;

Lines 9-10 contain a link to more details about the product: <link>http ://// www.ardenb.com//catalog// product.jsp?categoryId=140amp;subCategoryId=251amp; productId=40205amp;source=pfamp; ref=ab_aff_pf_k108283</link>

Additional supplemental element pairs can be defined and there are no constraints beyond that defined by the XML specifications as to the exact tags to be used. Together, these XML elements when inserted in the XML static document or document stream allow any software components examining the XML static document or document stream to uniquely identify any object/product in an image in any digital media form and supply the information to the above-described shopping system or any other system to be used as needed. XML is not limited to usage in defining static websites or digital publications, but can also be used in digital broadcasts or recordings, either contained within or surrounding the broadcast or separately in either a static document or streaming document form.

In an embodiment designed for video streams which have an embedded image, the present invention includes a method for adding XML elements containing a limited amount of product-related information to the video stream, and for identifying the object/product contained within that video stream when selected by a pointing device.

FIG. 30 presents single image frame from a video stream, with enlarged inset depicting a portion of the image frame that contains a representative object that the viewer would be interested in (a woman's purse). Assuming that a viewer is watching the video stream with a computerized device capable of reading embedded XML elements, and if they desire more information on the purse shown with the woman, then in accordance with the present invention they need only position their pointing device on the image of the purse and click to initiate the object/product's identification. Again the method is manifest in the code of that system.

FIG. 31 presents a section of XML responsible for definitions for declaring an image sub-element consisting of the purse. This section is a composite of XML elements. The present invention extends the XML element pair <img> </img> with the XML element pair <object> </object> for the definition of image contents which are identified objects.

In FIG. 31 the XML element pair <object> </object> is given a name with an attribute, x:name="Purse". The present invention extensions add at least one required XML element pair, chosen from among three additional new XML element pairs and 5 optional element pairs within the XML element pair <object> </object>. The primary representative XML elements pairs which are used are:

<spatiallocation> </spatiallocation> [this element pair contains the relative spatial coordinates of the product in the image. This element pair completed with the spatial coordinates is required];

<product> </product> [this element pair is a container identifying the DTD product extension];

<productID> </productID> [this element pair is a container for the product identification details];

<upc> </upc> [this element pair would contain the UPC code of the product];

<manufacturer> </manufacturer> [this element pair contains the manufacturer's name];

<id> </id> [this element pair contains the manufacturer's product number].

The supplemental representative XML elements pairs which optionally can be used are:

<caption> </caption> [this element pair contains a caption which could be used in a popup];

<srp> </srp> [this element pair contains the suggested retail price];

<title> </title> [this element pair contains a title for use in list of selected products];

<link> </link> [this element pair contains a link to more details about the product];

<syncframe> </syncframe> [this element pair contains the image frame number of the associated video stream to which this DTD extension applies].

FIG. 32 presents the original section of the XML section extended by the object/product identification information (highlighted) thru the insertion of the previous XML element pairs and a sample of possible content in context of those pairs with the exception of the <syncframe> element which applies only to video image streams. The primary representative XML elements are as follows:

Line 1 <spatiallocation>35, 30, 50, 10 identifies the relative spatial coordinates of the product in the image.

Line 2 <product> identifies the start of the DTD product extension container Lines 3-5 <productID> contain the product identification details, which are here indicated at line 4 to include the UPC code of the product <upc>123456 123456</upc>.

Line 6> contains the product caption <caption>Colleen Atwood Purse</caption>;

Line 7 contains the price <srp>$135.00</srp>;

Line 8 contains a title for an abbreviated representation of the link in the next line in a list of selected products: title>www.ColleenAtwood.com</title>;

Line 9 contains a link to more details about the product: <link>http:////www.ColleenAtwood.com//catalog// product.jsp?categoryId=140amp;subCategoryI d=251amp; productId=40205amp;source=pfamp; ref=ab_aff_pf_k108283</link>

Additional supplemental element pairs could be defined and there are no constraints beyond that defined by the XML specifications as to the exact tags to be used. Together, these XML elements when present in the XML sections allow the system of software components examining the video stream to uniquely identify any object/product in a frame image and supply the information to any other system to be used as needed. XML is not limited to usage in defining static websites or digital publications, but can also be used in digital broadcasts or recordings.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A shopping and purchase support system and marketplace, comprising:

an Internet based server;

a central data repository including a database in communication with said Internet based server;

information gathering software resident in said Internet based server for scraping the internet for consumer product-oriented web pages and classifying and indexing all of the information derived and storing said classified and indexed information in a database, said classified and indexed information at least including one or more product identifiers and corresponding advertised prices from each said consumer product-oriented web pages;

a Rich Internet Application (RIA) client hosted on said Internet based server and installable onto a client device;

a plurality of remote client devices each having a pre-installed user interface (UI) browser application, said RIA client being installable onto said remote client devices as a plug-in to said browser application to add specific capabilities to said browser application;

whereby upon subscription of a client device said Rich Internet Application (RIA) client application is pushed onto said client device, and is accessible directly from any open web page loaded in said UI browser application to draw information from the central data repository;

said RIA client including software instructions for mining product information at least including a product identifier and corresponding advertised price from an open web page loaded in said UI browser application, for comparing said product identifier and advertised price to said product identifiers and advertised prices stored in said server database, and for providing a visual indication that an advertised price for a corresponding product identifier stored in said server database is less than the advertised price for a matching product identifier from said open web page.

2. The shopping and purchase support system and marketplace according to claim 1, wherein said information gathering software resident in said Internet based server scrapes the internet for consumer product-oriented web pages and classifies and indexes all of the information derived to compile a product profile record at said central data repository.

3. The shopping and purchase support system and marketplace according to claim 2, wherein said product profile record includes at least the following consumer-product-related information for identified each consumer product:
product category;
product sub-category;
standard identification number (SIN);
uniform product code (UPC);
item name;
manufacturer;
retail distributors;
manufacturer suggested retail price (MSRP);
description;
features;
details/specifications;
warranties;
related products;
news;
warnings;
hazards; and
disclaimers.

4. The shopping and purchase support system and marketplace according to claim 2, wherein said information gathering software resident in said Internet based server scrapes the internet for retailer web pages that offer said consumer products for sale, and compile a retailer profile record at said central data repository that is linked to the product record.

5. The shopping and purchase support system and marketplace according to claim 4, wherein said retailer profile record includes at least:
retailer product name;
product identifier;
advertised price corresponding to said product identifier;
available stock by location.

6. A system for shopping and purchase support, comprising:
a computer web server comprising hardware and software for delivering content through the Internet to multiple client computers, said web server further comprising,
a central data repository in communication with the web server and hosting a database storing a plurality of data entries, each of said plurality of data entries comprising at least a product UPC code and detailed product information,
a computer program stored on computer readable media at said computer web server for automatically mining consumer-product-related information from product manufacturer URL web pages on the Internet and classifying and indexing all of the consumer-product-related information so derived and for populating said central data repository with the classified and indexed consumer-product-related information, said consumer-product-related information including product specifications, marketing information, pricing information, warranty information, and recall and product hazard information; and
a Rich Internet Application (RIA) client stored on computer readable media at said computer web server and downloadable therefrom to any of a plurality of remote client devices each having a pre-installed user interface (UI) browser application, said RIA client being installable onto said remote client devices as a plug-in to said browser application to add specific capabilities to said browser application, said additional capabilities including a shopping support user-interface accessible directly from a webpage viewed in said browser, and a protocol for inspecting a discrete consumer-product-elated object embedded within a webpage loaded into said browser, identifying said consumer-product-related object to said web server, and retrieving from the central data repository at said web server consumer-product-related information corresponding to said identified consumer-product-related object including product specifications, marketing information, pricing information, warranty information, and recall and product hazard information, said RIA client including software instructions for comparing said identified consumer-product-related object pricing information stored in said data repository the pricing information for said discrete consumer-product-related object embedded within a webpage loaded into said browser and for providing a visual indication that the pricing information stored in said data repository is less than the pricing information for said discrete consumer-product-related object embedded within said open webpage.

7. The system for shopping and purchase support according to claim 6, wherein said computer program for automatically mining consumer-product-related information from product manufacturer URL web pages on the Internet classifies and indexes at least the following consumer-product-related information for each identified product:
product category;
product sub-category;
standard identification number (SIN);
uniform product code (UPC);
item name;
manufacturer;
retail distributors;
manufacturer suggested retail price (MSRP);
description;
features;
details/specifications;
warranties;
related products;
news;
warnings;
hazards; and
disclaimers.

8. The shopping and purchase support system and marketplace according to claim 7, wherein said information gathering software resident in said Internet based server scrapes the internet for retailer web pages that offer said consumer products for sale, and compile a retailer profile record at said central data repository that is linked to the product record.

9. The shopping and purchase support system and marketplace according to claim 8, wherein said retailer profile record includes at least:
retailer product name;
current retail price;
available stock by location.

10. The shopping and purchase support system and marketplace according to claim 6, wherein said RIA client shopping support user-interface is a transparent user interface layered over the web page loaded into said browser using a transparent effect so that information on web page loaded into said browser remains visible.

11. The shopping and purchase support system and marketplace according to claim 10, wherein said RIA client shopping support user-interface includes at least a "Product Information" selection, a "Community Opinions" selection, an "RSS Feeds" selection, a "Product Search" selection, a "Purchase Options" selection.

12. The shopping and purchase support system and marketplace according to claim 11, wherein said RIA client shopping support user-interface includes an indexed tree of product categories, product lines, products and specific models that the consumer can navigate to find a desired product.

13. The shopping and purchase support system and marketplace according to claim 6 wherein said computer web server hosts an ecommerce marketplace platform integrated with the browser plug-in that allows users to suggest a price they want to pay for a product, and a type of marketplace/exchange that they wish to participate in.

14. The shopping and purchase support system and marketplace according to claim 13 wherein said ecommerce marketplace platform includes a direct-purchase format, an auction format, and a reverse auction group purchase format.

15. The shopping and purchase support system and marketplace according to claim 14 wherein said reverse auction group purchase format is represented by a plurality of colored indicators on said plug-in user interface.

\* \* \* \* \*